(12) United States Patent
Wark et al.

(10) Patent No.: US 7,586,647 B2
(45) Date of Patent: Sep. 8, 2009

(54) HALFTONE DETECTION AND REMOVAL

(75) Inventors: Timothy John Wark, The Gap (AU); James Austin Besley, West Ryde (AU); James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 11/174,590

(22) Filed: Jul. 6, 2005

(65) Prior Publication Data
US 2006/0023259 A1 Feb. 2, 2006

(30) Foreign Application Priority Data
Jul. 29, 2004 (AU) .............................. 2004904242
Jul. 29, 2004 (AU) .............................. 2004904250

(51) Int. Cl.
*H04N 1/40* (2006.01)
(52) U.S. Cl. ...................................... 358/3.06; 382/261
(58) Field of Classification Search .................. 358/1.9, 358/2.1, 3.2, 3.06–3.08; 382/210, 261, 264
See application file for complete search history.

(56) References Cited

U.S. PATENT DOCUMENTS

| | | | | |
|---|---|---|---|---|
| 4,403,257 A | 9/1983 | Hsieh | ........................... | 358/283 |
| 5,239,390 A | 8/1993 | Tai | .............................. | 358/458 |
| 5,333,211 A | 7/1994 | Kanda et al. | ................... | 382/54 |
| 6,563,958 B1 | 5/2003 | Andrew | ........................ | 382/268 |
| 6,650,439 B1 | 11/2003 | Nagarajan et al. | ............. | 358/2.1 |
| 2004/0066538 A1 | 4/2004 | Rozzi | .......................... | 350/2.1 |

OTHER PUBLICATIONS

Australian Office Action, dated May 22, 2007, Issued in Counterpart Application No. 2005202902.

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

Methods, computer program products and apparatuses are disclosed for processing images to detect and/or remove halftone. In one aspect, a portion of an image comprising a plurality of color channels is selected for processing (210), a frequency domain representation of the selected portion is generated for each color channel (220), data relating to predetermined regions in the frequency domain representations is processed (230), and halftone present in the selected portion is detected based on a result of the processing the data (240). In another aspect, an image is arranged into a plurality of bands each comprising a predetermined number of consecutive lines of pixels, each of the plurality of bands is arranged into a plurality of tiles of pixels, one of the plurality of tiles is selected as a selected portion, data relating to the selected portion is processed and halftone present in the selected portion is detected based on a result of the processing and on a result of processing at least one other portion of the image. Halftone may be detected based on spatial characteristics or frequency characteristics within the selected portion and detected halftone may be removed from spatial domain data or frequency domain data relating to the selected portion.

51 Claims, 20 Drawing Sheets

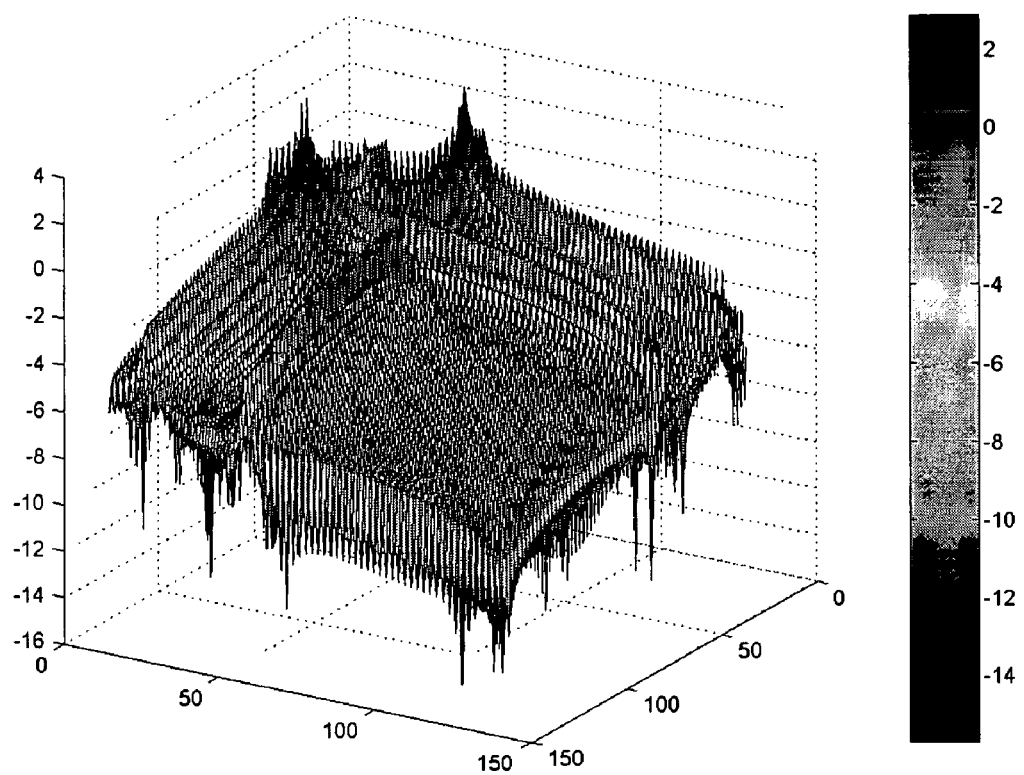
Fig. 12
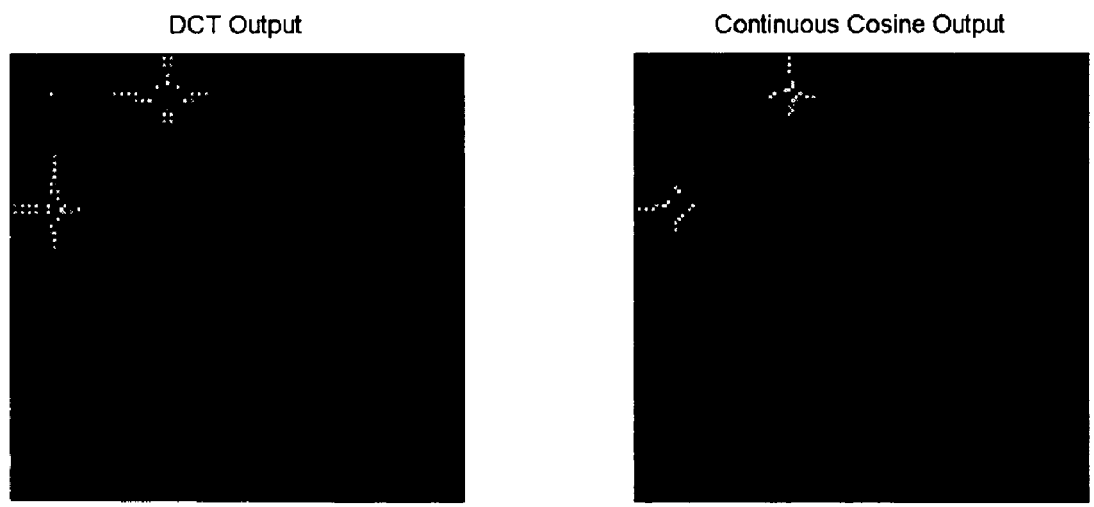
Fig. 13a　　　　　　　　　　Fig. 13b

_

HALFTONE DETECTION AND REMOVAL

FIELD OF THE INVENTION

The present invention relates generally to the processing of images for detecting and/or removing halftone and more particularly to the processing of images that are representative of documents such as those produced by photocopiers and desktop scanners.

BACKGROUND

Halftoning is a printing process that is used to represent a continuous grey-scale or colour signal by an array of dots of selected size/s that are placed in selected positions. The size and spacing of the dots is such that the printed document appears almost identical to the original continuous signal to the naked eye. The concept of halftone removal is relatively new due to a recent increase in the number of computer-based applications for processing scanned images for example in order to generate a compact electronic representation of the original documents.

One of the most common forms of halftoning is known as clustered-dot halftoning. In this method of halftoning, dots of varying sizes are placed on a regular grid during printing to visually represent the original continuous signal. Clustered-dot halftoning is used in modern printing techniques such as offset printing for producing magazines, brochures, etc., and in black and white laser printers.

In grey-scale clustered-dot halftoning, dots are placed on a regular grid according to a fixed spacing and a fixed angle. The inverse of the average dot spacing is known as the screen frequency and the average angle is known as the screen angle. An example of grey-scale clustered-dot halftoning applied to the image shown in FIG. 1a is shown in FIG. 1b, where the screen frequency and screen angle are depicted as $F_s$ and $\theta$, respectively. In colour printing, such as with CMYK (cyan, magenta, yellow, black), each colour channel is placed on a fixed screen frequency grid, but with a different screen angle for each channel. An example of such halftoning applied to the image shown in FIG. 1c is shown in FIG. 1d, where the screen angles for the cyan, magenta, yellow and black colour channels are depicted as $\theta_c$, $\theta_m$, $\theta_y$, and $\theta_k$, respectively. The different angles for each channel minimise interference patterns that may result from placement of the dot patterns relating to each channel on top of one another.

Modern inkjet printers use a technique known as dispersed-dot halftoning, which disperses dots within a local area in a non-regular fashion. Dispersed-dot halftoning is particularly suited to printing methods that are capable of controlling dot placement, shape and size to a high degree of accuracy.

A number of existing methods for removing halftone are briefly described hereinafter.

Low-pass filtering or blurring is the simplest method for removing halftone and can be effective if an image to be processed contains little high frequency information (e.g., a soft-focus photograph). However, if the image contains significant high frequency information such as sharp edges of text characters or graphic objects, these will be lost during low-pass filtering or blurring. This disadvantageously renders the method unsuitable for general use.

Look-up table methods use a set of training images that correspond to different types of fixed halftone patterns. Statistics relating to the mapping between each type of halftone and a corresponding correct continuous tone representation are collected. For an actual runtime image portion, the closest match in the look-up table is used to obtain the best parameters to map the halftone to continuous tone. A disadvantage with look-up table methods is that representative training data is required for each halftone type that is likely to be encountered in normal usage. Disadvantageously, training for combination regions containing both halftone and non-halftone, such as text superimposed on a photograph, is difficult.

Wavelet based methods exploit spatial-frequency information to low-pass filter images in regions where there are no edges, and low-pass filter images with a higher cut-off frequency in regions where edges do exist. In order for such methods to be successful, however, a reasonably large portion of an image (e.g., 512×512 pixels) must be processed at any one time. This disadvantageously increases the computational complexity required.

Projection methods are iterative procedures that attempt to estimate the original halftone kernel by starting with an initial estimate and subsequently converging within certain constraints. Sufficient convergence is associated with an output image that is a sensible continuous tone representation of the original image. As projection methods use an iterative procedure, such methods are generally unsuitable for applications that require a fast, fixed-time method for processing an image and removing halftone.

Binary-only methods are designed for bi-level images. Such methods examine the local statistics of binary halftoning to determine how to best represent the halftoning as a continuous tone. Binary-only methods are thus not suitable for continuous tone scanned images.

Frequency masking of colour halftones has been used for images containing only halftone, such as photographs. Such methods first convolve a box filter over the entire image and subsequently transform regions of the image (e.g., 256×256 pixel regions) into the frequency domain by means of a Fast Fourier Transform (FFT). The dominant peaks in each region are located and a Fourier filter is constructed to attenuate the peak frequencies in each region. An inverse FFT is then applied to each region to return to the spatial domain. Disadvantageously, such methods have been designed for regions containing only halftone. Furthermore, such methods rely on time consuming algorithms to accurately determine the locations of peaks in the frequency domain and process a relatively large portion of the image at any one time.

A need thus exists to provide methods, apparatuses and computer program products for detecting and removing halftone in images that overcome or at least ameliorate one or more disadvantages associated with existing arrangements.

SUMMARY

Methods, computer program products and apparatuses are disclosed herein for processing images to detect and/or remove halftone.

According to an aspect of the present invention, a portion of an image comprising a plurality of colour channels is selected for processing, a frequency domain representation of the selected portion is generated for each colour channel, data relating to predetermined regions in the frequency domain representations is processed, and halftone present in the selected portion is detected based on a result of the processing the data.

The selected portion may be selected by arranging the image into a plurality of bands each comprising a predetermined number of consecutive lines of pixels, arranging each of the plurality of bands into a plurality of tiles of pixels, and selecting one of the plurality of tiles as the selected portion.

The detected halftone may be removed by preparing a frequency mask based on a result of the processing, applying the frequency mask to at least one of the predetermined regions in the frequency domain representations of the selected portion, and converting the frequency domain representations to a spatial domain representation. At least one predetermined region in each of the colour channels may be masked irrespective of whether halftone is detected in each of the colour channels. The frequency mask may comprise a band-stop filter for removing dominant halftone frequency components.

Alternatively, detected halftone may be removed from data relating to a spatial representation of the selected portion.

The foregoing steps or processing are typically repeated for successive portions of the image. Halftone present in a currently selected portion may be detected based on halftone detected in at least one previously processed portion of the image.

According to another aspect of the present invention, an image is arranged into a plurality of bands each comprising a predetermined number of consecutive lines of pixels, each of the plurality of bands is arranged into a plurality of tiles of pixels, one of the plurality of tiles is selected as a selected portion, data relating to the selected portion is processed and halftone present in the selected portion is detected based on a result of the processing and on a result of processing at least one other portion of the image.

Halftone may be detected based on spatial characteristics or frequency characteristics within the selected portion.

In embodiments based on spatial characteristics, the processing may comprise quantisation of data relating to the pixels in the selected portion, assigning pixels that have the same value and that are adjacent to one another in the selected portion to a connected component, determining the number of unique connected components in the selected portion and comparing the number of unique connected components to a threshold value. The halftone may be detected based on a result of the comparison. The threshold value may be increased when at least one portion adjacent to the selected portion contains halftone and the threshold value may be decreased when at least one portion adjacent to the selected portion contain no halftone.

In one embodiment, data relating to each of a plurality of colour channels for the selected portion is quantised, the number of unique connected components for each of the plurality of colour channels is determined and the threshold value is set equal to the maximum of the numbers of unique connected components for each of the plurality of colour channels.

In embodiments based on frequency characteristics, a frequency domain representation of each of a plurality of colour channels relating to the selected portion may be generated and data relating to predetermined regions in the frequency domain representations processed.

The halftone may be removed after detection from spatial domain data or frequency domain data relating to the selected portion. In the frequency domain, halftone may be removed by preparing and applying a frequency mask to at least one of the predetermined regions in the frequency domain representations of the selected portion. The frequency domain representations may subsequently be converted back to the spatial domain. The frequency mask may be prepared based on one or more categories of halftone detected in the selected portion such as standard halftone and colour laser copier (CLC) halftone. The frequency mask may comprise a band-stop filter for removing dominant halftone frequency components. At least one predetermined region in each of said colour channels is masked irrespective of whether halftone is detected in each of said colour channels.

The methods described herein may be reduced to practice in the form of a computer program product, an application specific integrated circuit (ASIC) and/or an apparatus.

BRIEF DESCRIPTION OF THE DRAWINGS

A small number of embodiments of the present invention are described hereinafter by way of example only, with reference to the accompanying drawings in which:

FIG. 1b shows application of halftoning to the image of FIG. 1a;

FIG. 12 is a surface plot of an example of a continuous Fourier-Cosine transform applied to a synthesized halftone signal;

FIGS. 13a and 13b show DCT and continuous Cosine outputs for a common input signal, respectively;

DETAILED DESCRIPTION

Embodiments of methods, apparatuses and computer program products for detecting and removing halftone from documents or images are described hereinafter. In the context of the present specification, use of the term "remove" and its various forms is not intended to convey "absolute" removal. Rather, embodiments of the present invention remove halftone from scanned documents or images only to a certain degree, which may be substantial or more limited.

Figure 19:
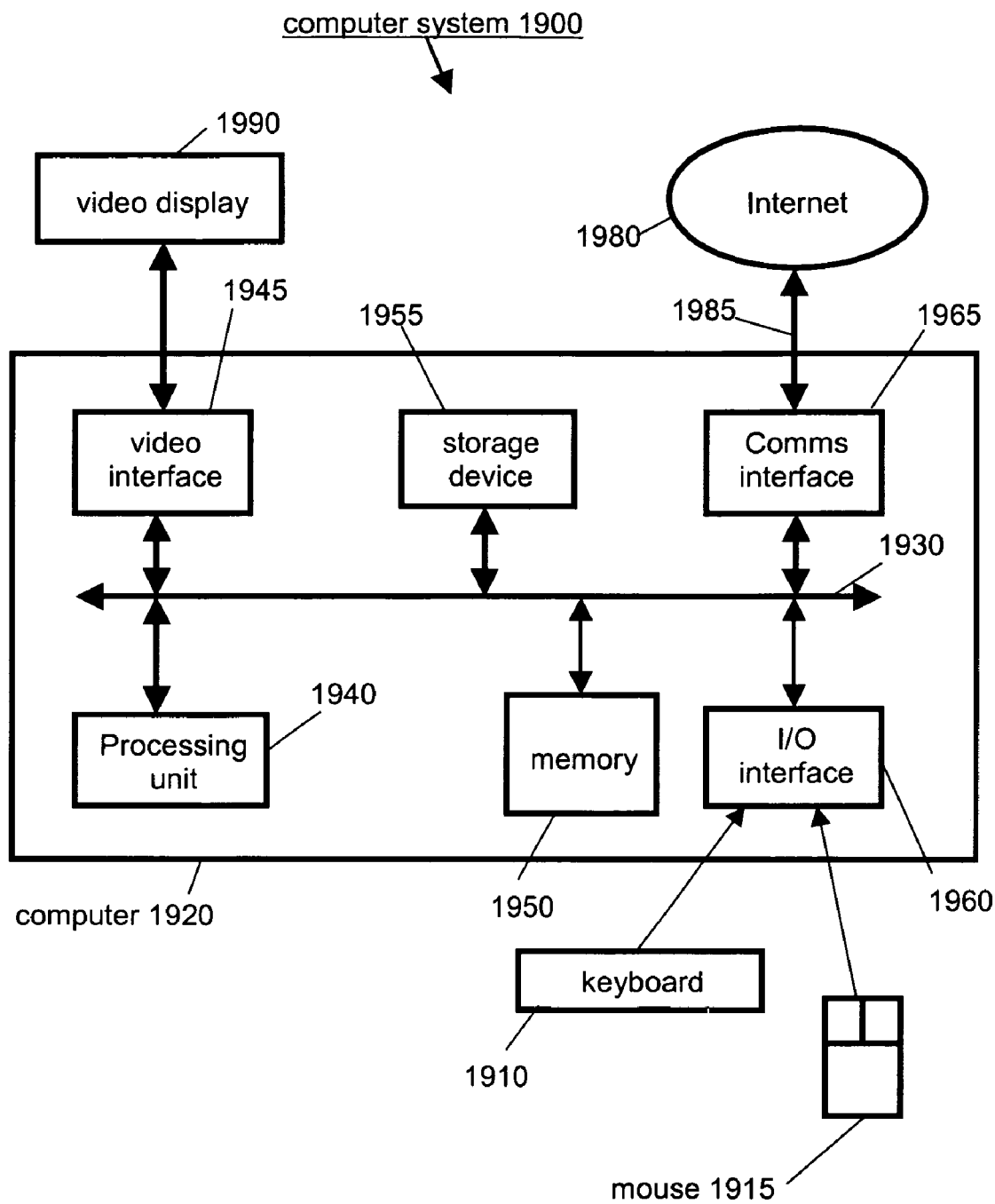
FIG. 19 is a schematic block diagram of a computer system with which embodiments of the present invention may be practiced.

FIG. 19 is a schematic representation of a computer system 1900 that may be used to practice the methods and computer program products described hereinafter. Specifically, the computer system 1900 is provided for executing computer software that is programmed to assist in detecting and removing halftone from scanned documents or images. The computer software executes under an operating system such as MS Windows XP™ or Linux™ installed on the computer system 1900.

The computer software involves a set of programmed logic instructions that may be executed by the computer system 1900 for instructing the computer system 1900 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer program may be processed using a compiler into a binary format suitable for execution by the operating system. The computer program is programmed in a manner that involves various software components, or code means, that perform particular steps of the methods described hereinbefore.

The components of the computer system 1900 comprise: a computer 1920, input devices 1910, 1915 and a video display 1990. The computer 1920 comprises: a processing unit 1940, a memory unit 1950, an input/output (I/O) interface 1960, a communications interface 1965, a video interface 1945, and a storage device 1955. The computer 1920 may comprise more than one of any of the foregoing units, interfaces, and devices.

The processing unit 1940 may comprise one or more processors that execute the operating system and the computer software executing under the operating system. The memory 1950 may comprise random access memory (RAM), read-only memory (ROM), flash memory and/or any other type of memory known in the art for use under direction of the processing unit 1940.

The video interface 1945 is connected to the video display 1990 and provides video signals for display on the video display 1990. User input to operate the computer 1920 is provided via the input devices 1910 and 1915, comprising a keyboard and a mouse, respectively. The storage device 1955 may comprise a disk drive or any other suitable non-volatile storage medium.

An optical document scanning apparatus (not shown) may be coupled to the computer system 1900 via the input/output (I/O) interface 1960. Accordingly, documents scanned by the optical scanning apparatus may be provided to the computer system 1900 for halftone detection and removal.

Each of the components of the computer 1920 is connected to a bus 1930 that comprises data, address, and control buses, to allow the components to communicate with each other via the bus 1930.

The computer system 1900 may be connected to one or more other similar computers via the communications interface 1965 using a communication channel 1985 to a network 1980, represented as the Internet.

The computer software program may be provided as a computer program product, and recorded on a portable storage medium. In this case, the computer software program is accessible by the computer system 1900 from the storage device 1955. Alternatively, the computer software may be accessible directly from the network 1980 by the computer 1920. In either case, a user can interact with the computer system 1900 using the keyboard 1910 and mouse 1915 to operate the programmed computer software executing on the computer 1920.

The computer system 1900 has been described for illustrative purposes. Accordingly, the foregoing description relates to an example of a particular type of computer system suitable for practicing the methods and computer program products described hereinbefore. Other configurations or types of computer systems can be equally well used to practice the methods and computer program products described hereinbefore, as would be readily understood by persons skilled in the art. For example, the methods and computer program products described hereinbefore can be practiced using a handheld computer such as a Personal Digital Assistant (PDA) or a mobile telephone.

In other embodiments, the present invention may also be provided and/or practiced as an Application Specific Integrated Circuit (ASIC) for incorporation within electronic equipment such as photocopiers and desktop scanners. ASIC's are typically designed to perform a particular function or series of functions using computer systems and design software such as Very high speed integrated circuit Hardware Description Language (VHDL). VHDL provides a means for defining the interconnection of a set of basic circuit building blocks, which are typically drawn from a library provided by a circuit manufacturer.

Figure 1A:
FIG. 1a shows an original grey-scale image.
Figure 1B:
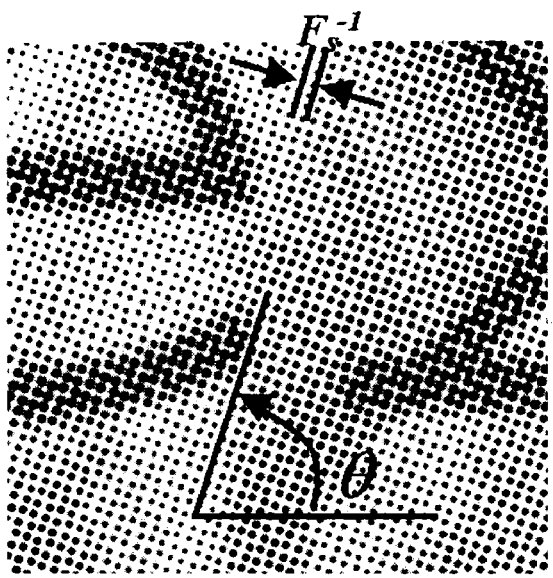
Figure 1C:
FIG. 1c shows an original color image.
Figure 1D:
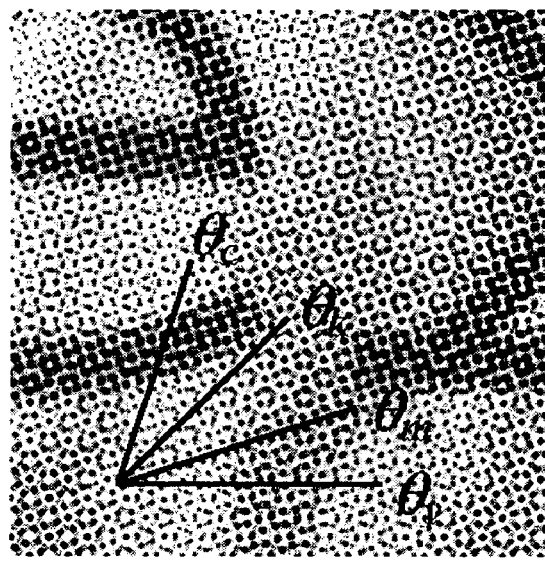
FIG. 1d shows application of halftoning to the image of FIG. 1c.
Figure 2:
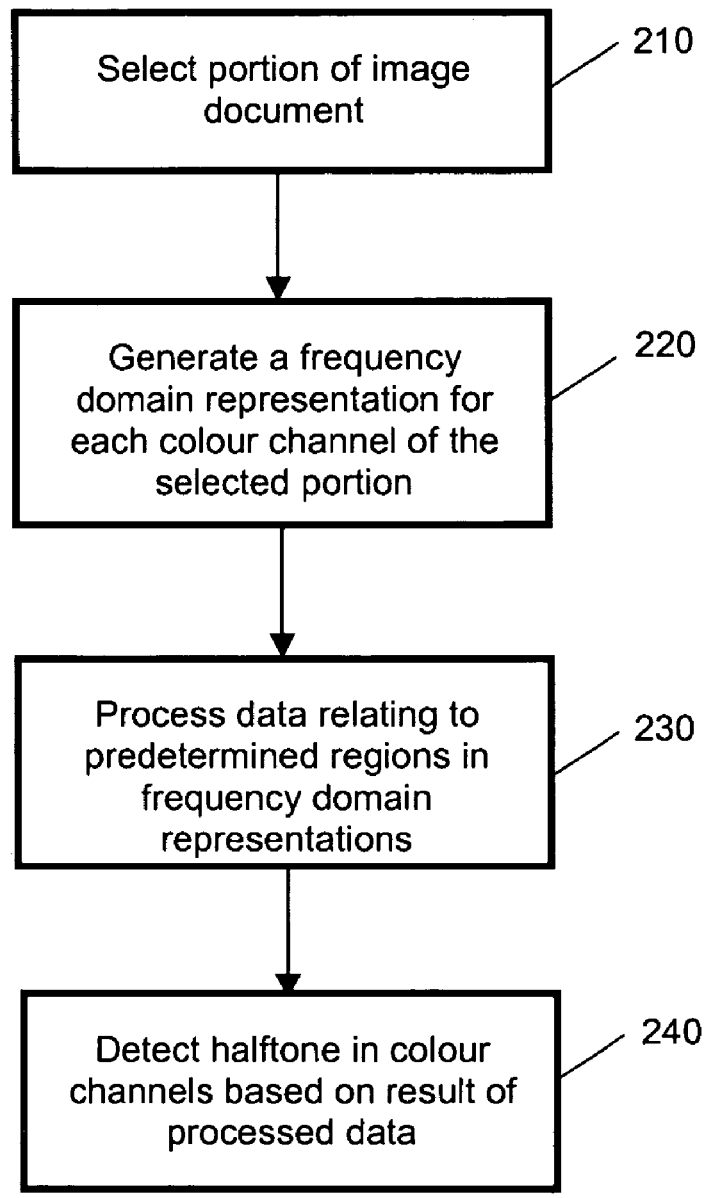
FIG. 2 is a flow diagram of a method for detecting and removing halftone from a portion of an image representative of a document.

FIG. 2 is a flow diagram of a method for detecting halftone in an image representative of a document.

At step 210, a portion or tile of the image is selected, which comprises multiple colour channels (e.g., CMYK (cyan, magenta, yellow, black) or RGB (red, green, blue)). A frequency domain representation of each colour channel of the selected portion is generated at step 220. Data relating to predetermined regions in the frequency domain representations is processed at step 230. At step 240, halftone present in the selected portion is detected based on a result of processing step 230.

Successive portions of the image may be selected and processed in accordance with the method of FIG. 2 to detect halftone throughout the image. The method of FIG. 2 may be practiced using the computer system 1900 described hereinbefore with reference to FIG. 19.

Figure 3:
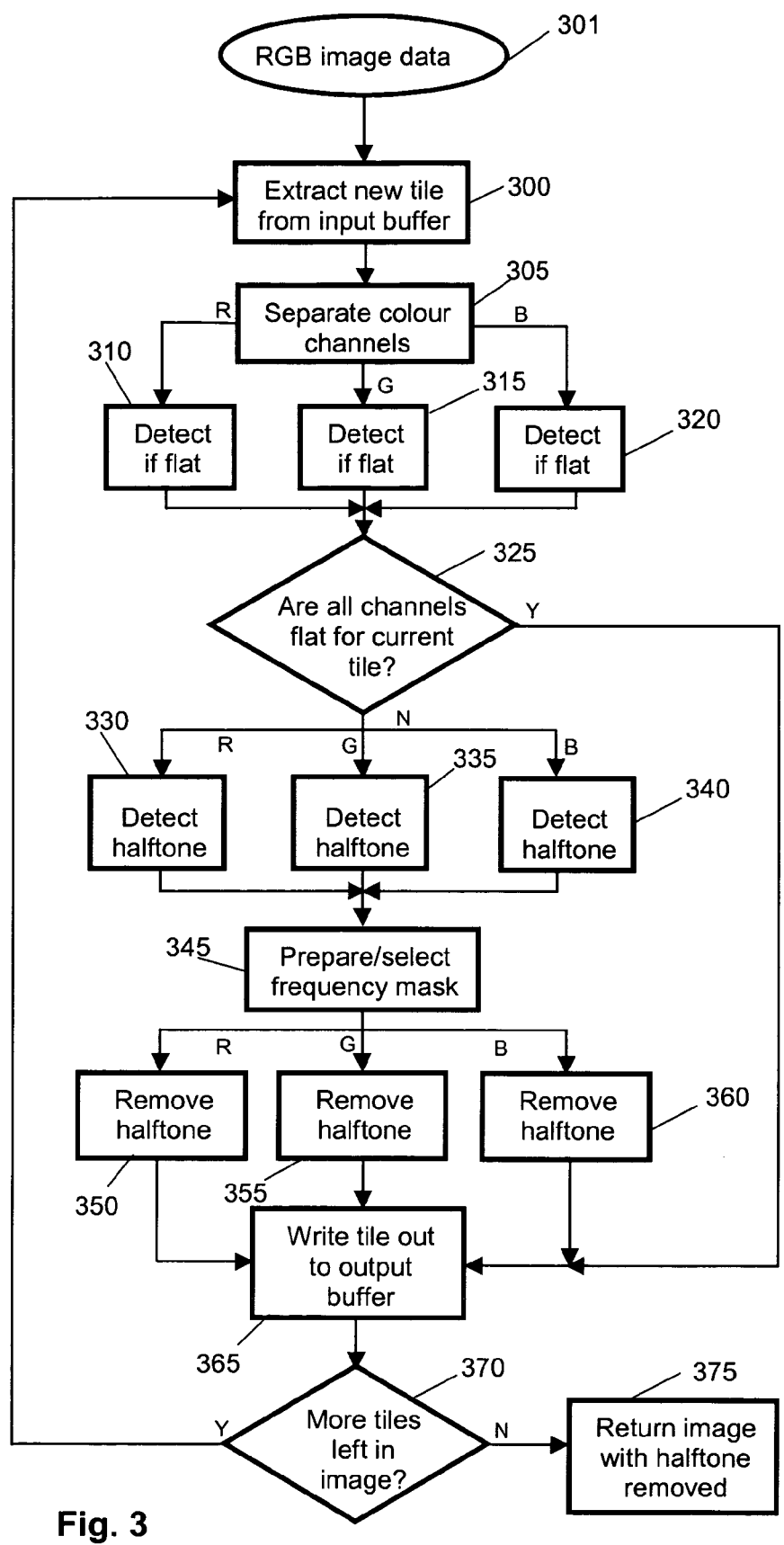
FIG. 3 is a flow diagram of a method for detecting and removing halftone from a portion of an image.

FIG. 3 is a flow diagram of a method or process for removing halftone from data representative of an image, which may be practiced using the computer system 1900 described hereinbefore with reference to FIG. 19. The image data 301 is typically produced by scanning an image using an apparatus such as a 600 dpi scanner with RGB (red, green, blue) colour channels. Other types of scanners or scanning mechanisms may alternatively be practiced, as would be obvious to those skilled in the art. Scanned data relating to the entire image is typically stored in an input memory buffer, which may comprise the memory 1950 of the computer system 1900. The method of FIG. 3 is based on a concept of tiling the image and separately processing each tile or portion of the image. More specifically, each tile is processed to detect and subsequently remove halftone. From a computational point of view, data access is thus restricted to a local area of the image as opposed to random access of the entire scanned image. Embodiments of the present invention are advantageous in that halftone detection and removal can be performed in one pass of the image data. A band of tiles are held in external memory and tiles are read once from external memory into internal memory for processing in tile raster order. This results in an efficient implementation bandwidth and enables cheaper hardware implementations of the method/s.

A new tile is extracted or read from an input memory buffer in step 300. Based on typical halftones found in a range of scanned documents, it is desirable to remove halftones with screen frequencies ranging between 90 dpi and 190 dpi. A tile size of 16×16 pixels scanned at 600 dpi represents the smallest size that is a power of 2 and that is sufficiently large to accommodate sufficient information relating to the lowest frequency halftone that is desired to be detected. The tiling process is described in further detail hereinafter with reference to FIG. 4.

Once a portion of the image is extracted in a square tile, the data relating to the tile is separated into colour channels (R,G,B) in step 305. The method for removing halftone operates on each colour channel separately.

In steps 310, 315 and 320, a determination is made whether each of the Red, Green and Blue colour channels, respectively, is essentially flat. An example of a flat colour channel is a tile located in an area of the scanned image that comprises white background. Assuming that each channel has values ranging from 0 to 255, flatness may be determined using a calculation that measures the range in the tile for a particular colour channel as follows:

$$\text{range} = \max_i p_i - \min_i p_i$$

where: i is an index into all pixels p in the current tile channel, being from 0 to 255 in the case of a 16×16 tile.

If the range is less than a threshold value (e.g., 20), the colour channel is "flat" and thus does not contain halftone.

In step 325, a determination is made whether all the colour channels relating to the current tile are flat. This step avoids the more time-consuming task of detecting halftone in the frequency domain if it can be quickly detected from spatial cues that the tile is flat and thus that no substantial halftoning exists. If all of the colour channels are flat (Y), processing continues at step 365.

Figure 5A:
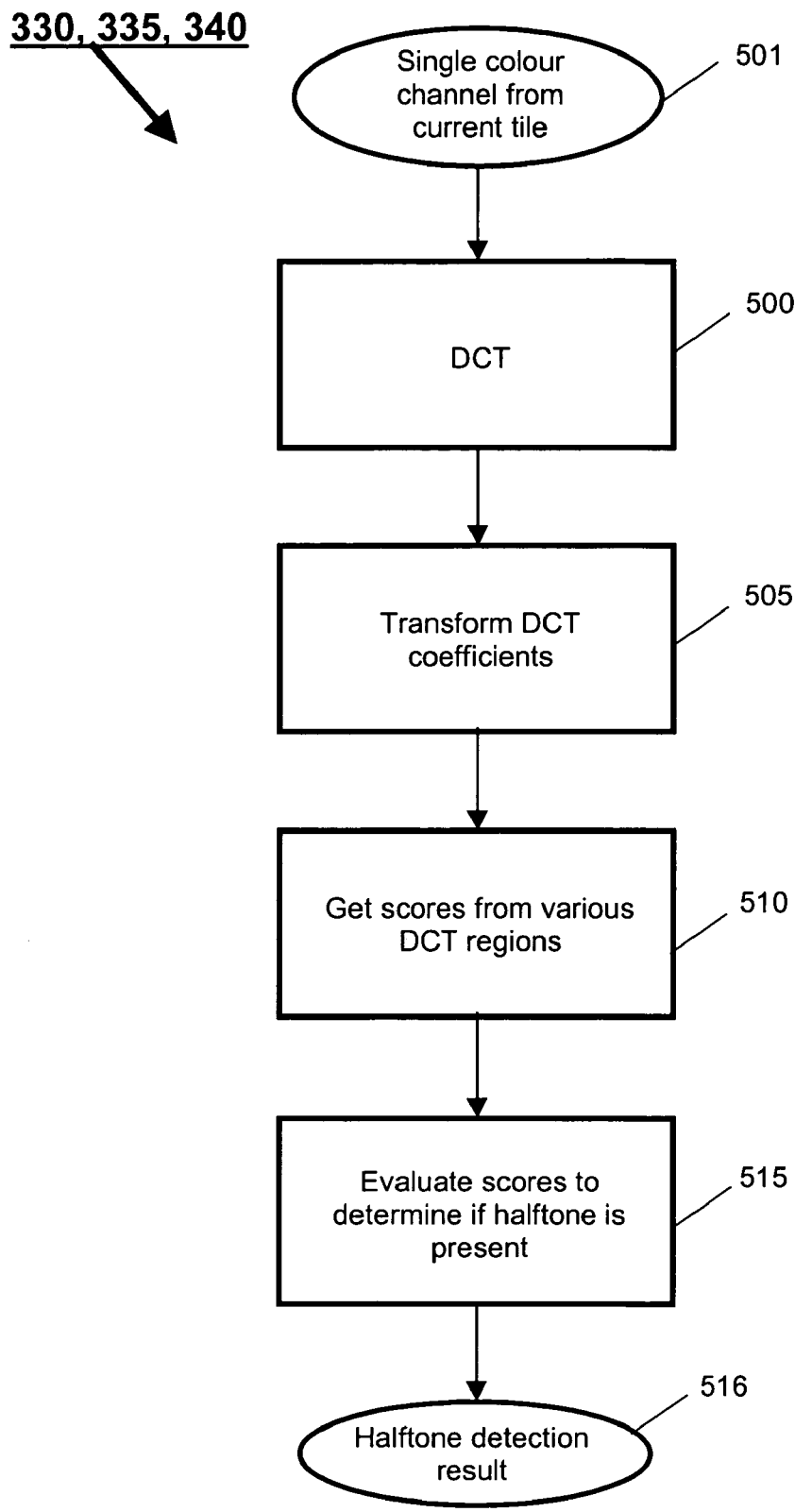
FIG. 5a is a flow diagram of a method for detecting halftone.

If any of the colour channels are not flat (N), however, processing continues at steps 330, 335 and 340, wherein halftoning is detected for each of the RGB colour channels, respectively. FIG. 5a shows the process performed in steps 330, 335 and 340 of FIG. 3 in additional detail.

Figure 5B:
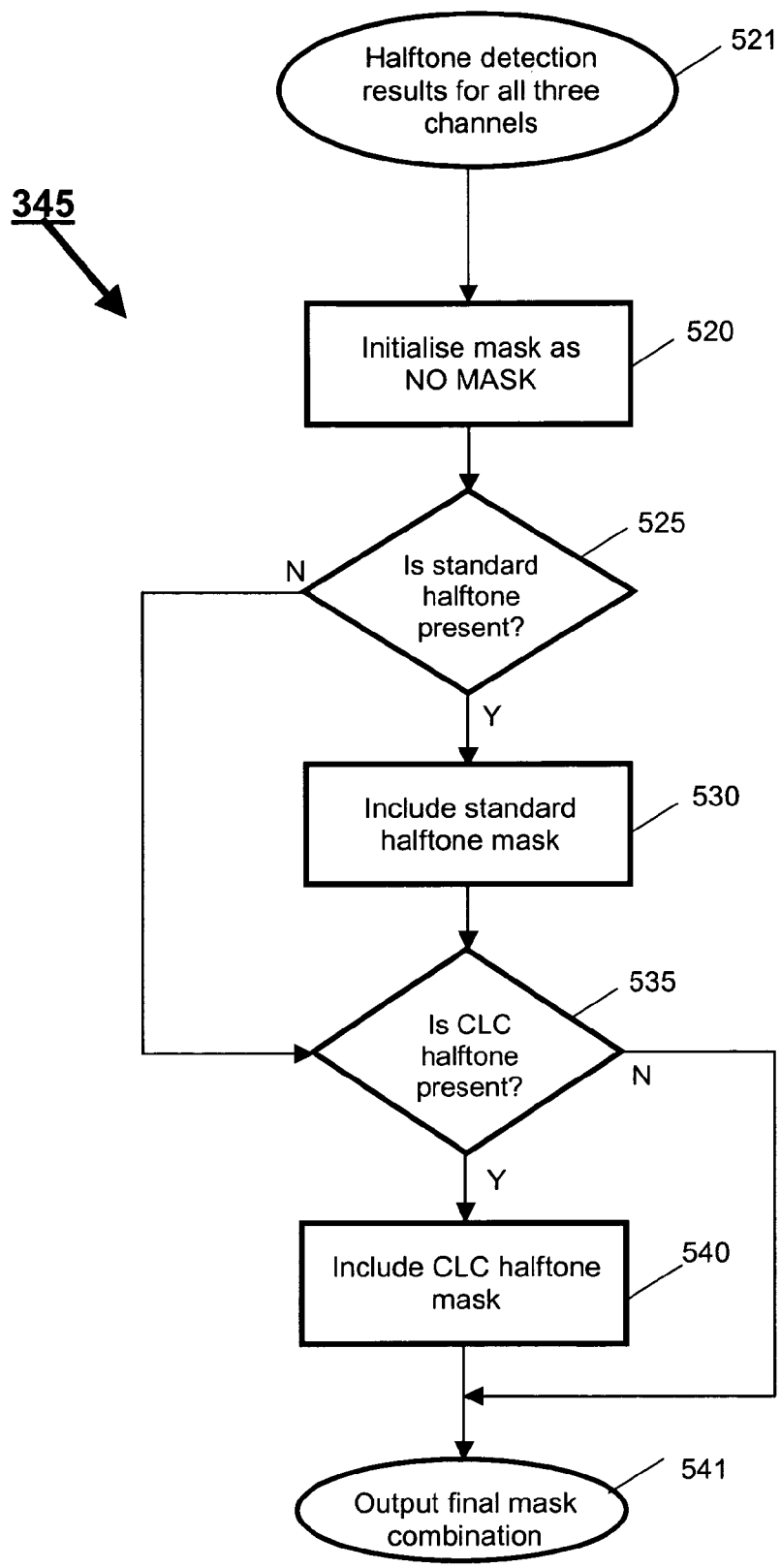
FIG. 5b is a flow diagram of a method for preparing a frequency mask for removing halftone.
Figure 5C:
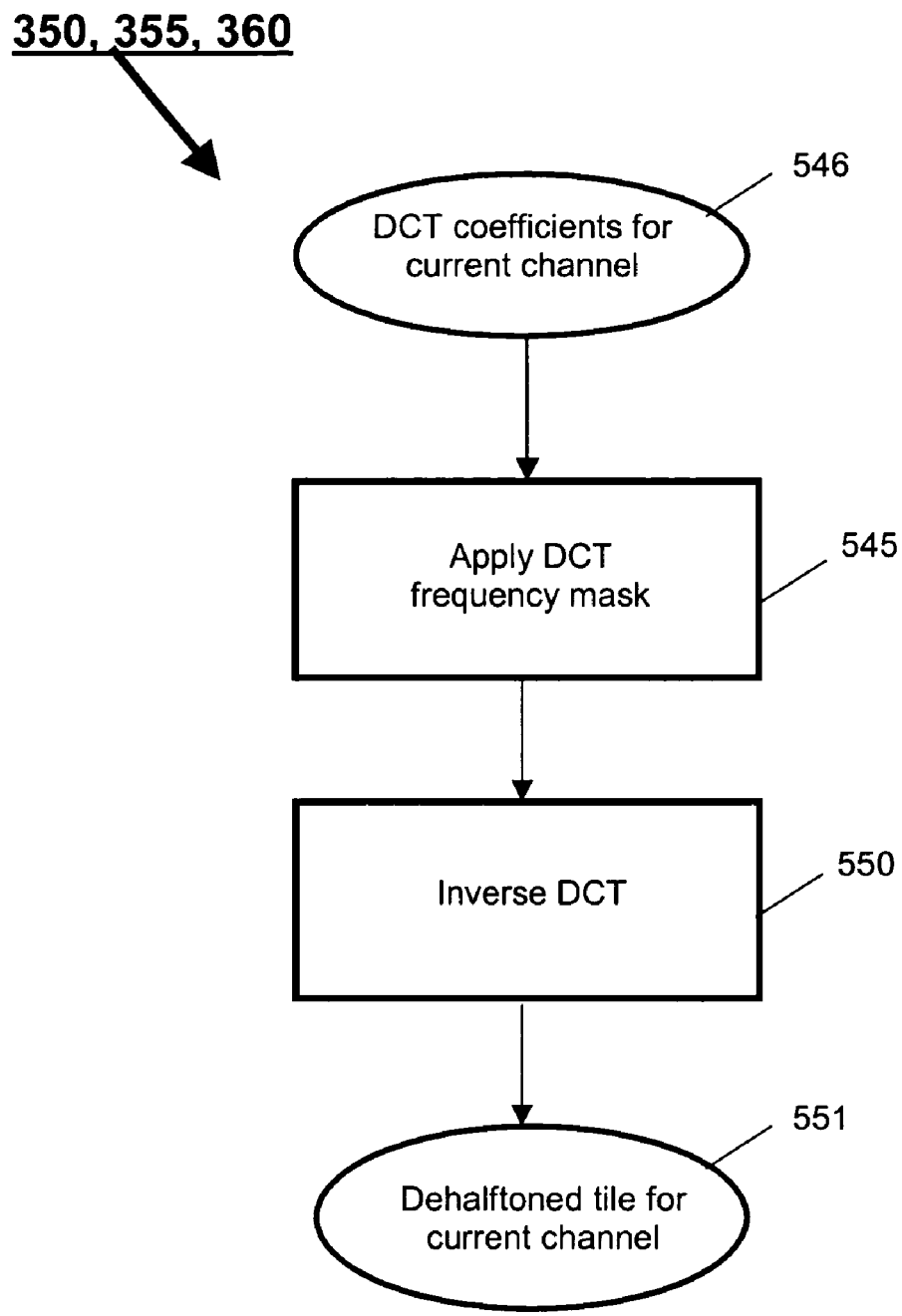
FIG. 5c is a flow diagram of a method for removing halftone from a colour channel.

A frequency mask is prepared or selected in step 345 and is used in steps 350, 355 and 360 to remove halftone from the separate RGB color channels, respectively. The frequency mask is prepared based on the type of halftone detected and applied to the DCT coefficients to remove major halftone artefacts. A mask is defined as a region (i.e., a set of locations) where all the original DCT coefficients $C_i$ are set to a preferred value of 0. However, other values and processes may be used in other embodiments of the present invention. FIG. 5b shows a method for preparation of a frequency mask in additional detail, which is described hereinafter. FIG. 5c shows a method for removing halftone from each channel by application of a frequency mask, which is also described in further detail hereinafter.

The data relating to the current tile is written to an output buffer or the memory 1950 in step 365. If there are more tiles in the scanned image to be processed (Y), at decision step 370, processing reverts to step 300 for reading the data relating to the next tile. If not (N), the image with halftone removed is returned in step 375.

Figure 4:
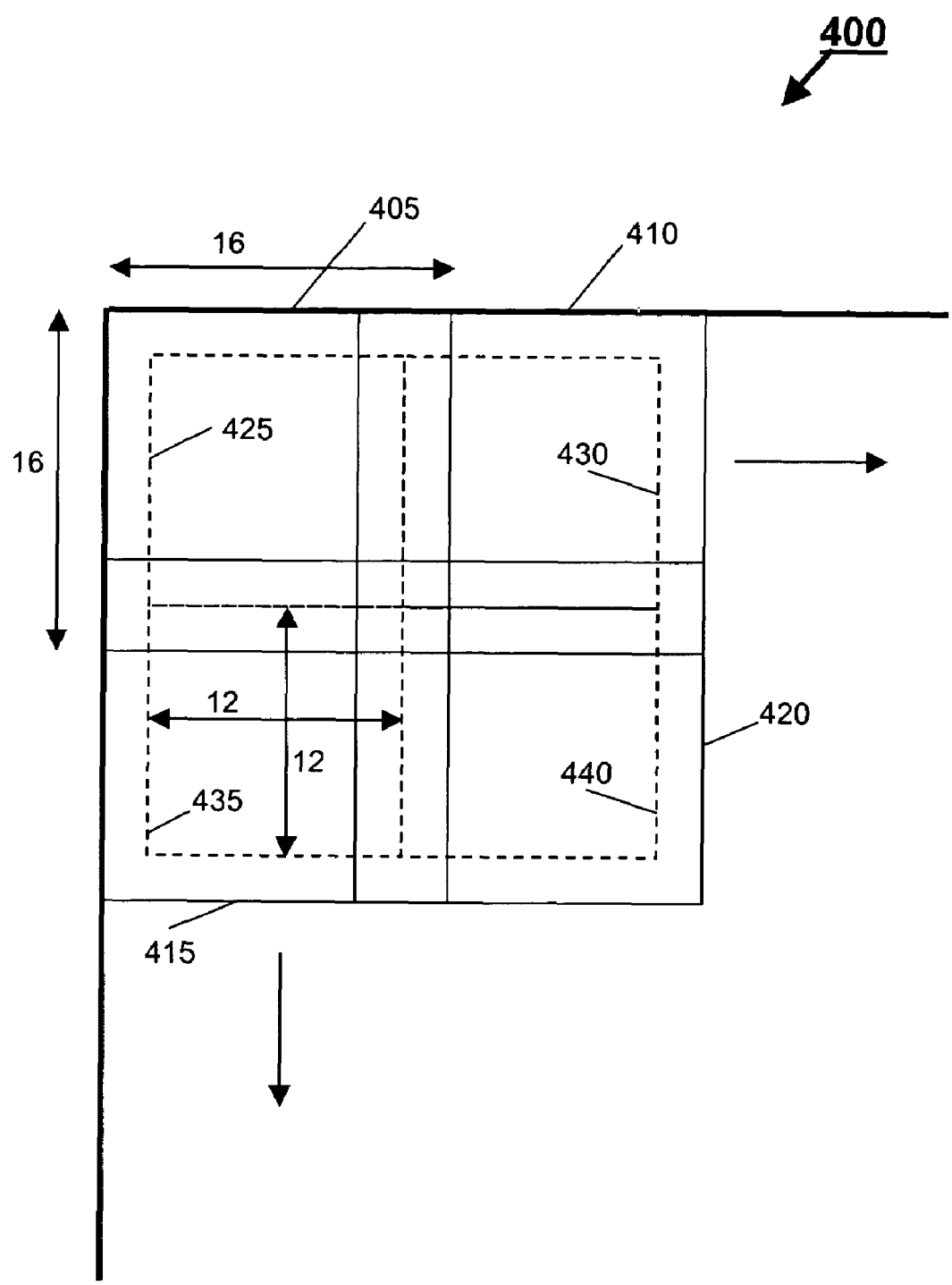
FIG. 4 is a representation of tiling of a colour channel of a scanned image.

FIG. 4 is a representation of tiling over a colour channel of a scanned image. The dimensions shown are in pixels and are based on a 600 dpi scanned image. With reference to FIG. 4, the tiles 405, 410, 415 and 420 are each of dimension 16×16 pixels and form part of the scanned image 400. The areas 425, 430, 435 and 440 shown in broken lines correspond to 12×12 pixel central areas of the tiles 405, 410, 415 and 420, respectively. As further described hereinafter, Discrete Cosine Transform (DCT) and inverse DCT processing of the tile data may result in artefacts around the border of the tile in the first two rows/columns from the edge. Thus, only the 12×12 pixel central area of each tile is written to the output memory buffer each time a tile is processed. By writing out only the data relating to the central portion of the tile to the output buffer, these artefacts can be avoided. Each new tile is placed 12 columns along from where the previous tile was located. If a current tile is at the edge of the page, the next tile starts 12 rows down back in the first column. This procedure is repeated until the entire page is tiled. This implementation results in the outer two pixels rows and columns around the border of the total image not being processed.

FIG. 5a shows a flow diagram of a method for detecting halftone, which may be used in steps 330, 335 and 340 of FIG. 3. The method of FIG. 5a is described with reference to a single colour channel and with reference to a 600 dpi sampled image divided into tiles of 16×16 pixels. Tile data for a single colour channel is converted from the spatial domain to the frequency domain by means of a Discrete Cosine Transform (DCT) in step 500. A fast DCT implementation, which is optimised for 16×16 arrays, may be used as a consequence of a tile size of 16×16 pixels (the number of pixels in each direction advantageously comprising a power of 2). The output of the DCT is another 16×16 array which contains the DC (mean) value in the top left corner and various horizontal and vertical frequency components in the remainder of the array. The highest frequency is represented in the bottom right corner (300 dpi for a 600 dpi sampled image). Once obtained, the DCT coefficients are analysed to obtain frequency information about the current tile. The DCT coefficients are annotated as $C_i$, where i is an index into all the coefficients in the current DCT tile (i.e., i=0 to 255 for a 16×16 pixel tile). The indexing is set such that the DC value is $C_0$. A tile generally lies in one of the following three categories:

1. Tile with varying signal, but no halftone (e.g., black text on white background)
2. Tile with halftone only (e.g., part of a photograph)
3. Tile with halftone and non-halftone (e.g., black text on a photograph)

Detection and removal of halftone is significantly more difficult for tiles in the third category. Tiles containing no halftone (first category) and tiles containing only halftone (second category) may simply be left or ignored and low-pass filtered or blurred, respectively. However, this approach achieves poor results in tiles that contain both types of signal. Such tiles are relatively more difficult to detect (i.e., the spectral characteristics can be highly ambiguous) and care must be exercised in selecting which frequencies to filter to preserve sharp edges and corners as much as possible whilst removing as much of the halftone as possible.

Figures 6A, 6B:
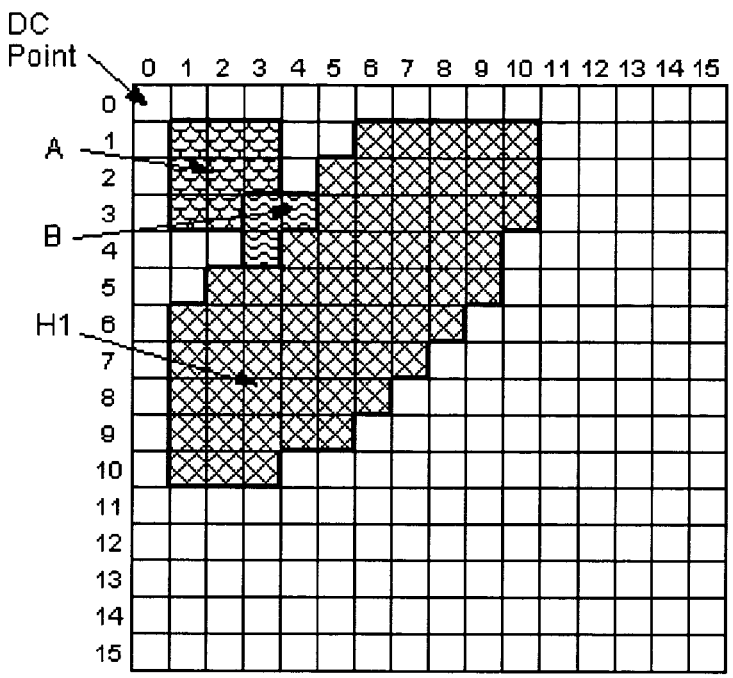
FIG. 6a is a representation of DCT regions analysed to detect standard halftone according to an embodiment.
FIG. 6b is a representation of DCT regions analysed to detect standard halftone according to another embodiment.

A number of distinct DCT coefficient regions are analysed to identify characteristics for determining which of the three categories a tile fits into. FIG. 6a shows such regions for a specific embodiment and for the case of standard halftone, which are as follows:

DC Point: This region represents the average value within the tile for the current channel.

A: This region contains frequency components relating to slowly varying characteristics within the tile.

B: This region represents a frequency zone where a characteristic frequency dip is expected for a tile that contains both halftone and non-halftone regions.

$H_1$: This region represents locations in which characteristic peaks relating to halftone are expected to lie. Further details relating to the derivation of this region are provided in Table A, hereinafter, forming part of this document.

Before the DCT output is analysed, however, the following transform is applied to the DCT coefficients output at step 505:

$$\hat{C}_i = \log(|C_i| + \sigma)$$

where: i is an index into all the coefficients in the current DCT tile, from 0 to 255; and $\sigma$ is set to a preferred value of 0.000001 to ensure no overflows occur in the log calculation if $|C_i|=0$. This ensures that all local peaks are in a positive direction, and the log function scales their magnitudes together more appropriately for our analysis. Note that the original coefficients $C_i$ are still retained as these are required for converting back to the spatial domain at a later stage.

A number of scores are obtained from the various DCT regions in step 510 as follows:

$$score_{DC} = \hat{C}_0$$
$$score_A = \max_j \hat{C}_j \quad j \in A$$
$$score_B = \max_j \hat{C}_j \quad j \in B$$
$$score_{H_1} = \max_j \hat{C}_j \quad j \in H_1$$

where: A, B, $H_1$ and DC comprise the regions described hereinbefore with reference to FIG. 6a.

The calculated scores are evaluated to determine whether halftone is present in step 515. Evaluation of the calculated scores is performed based on the logical decisions contained in Table 1, hereinafter:

TABLE 1

IF ($score_{H_1}$ > $\tau_1 score_A$)
    return TILE HAS STANDARD HALFTONE
ELSE IF ($score_{H_1}$ > $\tau_2 score_B$ AND $score_B$ < $score_A$)
    IF ($score_{H_1}$ > $\tau_3 score_{DC}$)
        return TILE HAS STANDARD HALFTONE
    END
ELSE
    return TILE HAS NO STANDARD HALFTONE
END Generally, but not always, the first case indicates that the tile is halftone only and the second case indicates that the tile contains both halftone and non-halftone. If neither of the above cases apply, then it is assumed the tile contains no halftone. $\tau_1=0.9$, $\tau_2=1.0$ and $\tau_3=0.6$ comprise preferred values for a specific embodiment of the method. The preferred values are derived from parameters that have been optimised to obtain good results for the specific embodiment based on a broad range of sample halftoned tiles and corresponding scanned images.

Figure 5D:
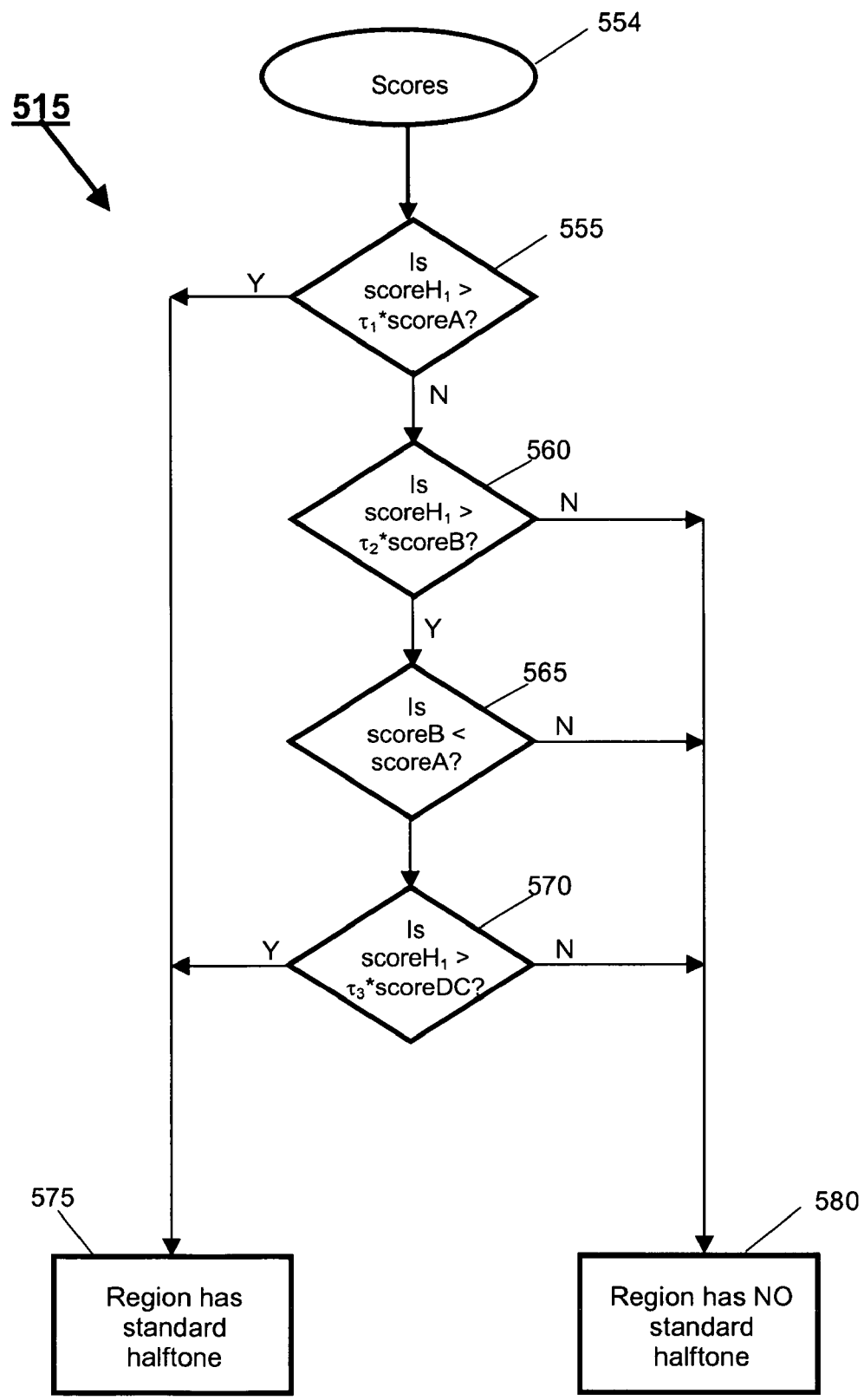
FIG. 5d is a flow diagram of a method for detecting the presence of standard halftone.

FIG. 5d shows a flow diagram of a method using the logical decisions in Table 1 for evaluating scores 554 to determine whether a current tile has standard halftone or not. The method of FIG. 5d may be used to perform step 515 of FIG. 5a. In this instance, the regions A, B, $H_1$ and DC refer to the regions A, B, $H_1$ and DC shown in FIG. 6a.

Referring to FIG. 5d, a determination is made at step 555 whether the score for region $H_1$ is greater than the score for region A multiplied by a factor $\tau_1$. If step 555 returns (Y), a conclusion is made that the tile has standard halftone at step 575. If step 555 returns (N), a determination is made at step 560 whether the score for region $H_1$ is greater than the score for region B multiplied by a factor $\tau_2$. If step 560 returns (N), a conclusion is made that the tile does not have standard halftone at step 580. If step 560 returns (Y), a determination is made at step 565 whether the score for region B is less than the score for region A. If step 565 returns (N), a conclusion is made that the tile does not have standard halftone at step 580. If step 565 returns (Y), a determination is made at step 570 whether the score for region $H_1$ is greater than the score for the DC region multiplied by a factor $\tau_3$. If step 570 returns (Y), a conclusion is made that the tile has standard halftone at step 575. If step 570 returns (N), a conclusion is made that the tile does not have standard halftone at step 580.

In another embodiment of a method for detection of standard halftone, the DCT regions used to obtain scores comprise the 16 regions 650 denoted $R_0$ to $R_{15}$ in FIG. 6b. These regions are selected to take the form of radial bands in the DCT output to minimise the sensitivity of the method to the screen angle of a clustered halftone and to minimise the number of regions by separating bands along a single dimension (radially).

In this embodiment, the region, i, associated with the element in the jth row and kth column of the DCT is given by the square root of the sum of the squares of the indices j and k, rounded down, and clamped to the range 0 to 15:

$$i = \min\lfloor 15, \text{floor}(\sqrt{j^2 + k^2}) \rfloor$$

Region $R_0$ comprises the DC component and subsequent regions follow a radial band structure as shown in FIG. 6b.

The score for the $i^{th}$ region is calculated as the sum of the absolute values of the DCT elements within that region:

$$score_i = \sum_j |C_j| \quad j \in R_i$$

The halftone detection parameter, $score_{HT}$, is defined as follows:

$$score_{HT} = \sum_{i=0}^{15} \tau_i \, score_i$$

where: the $\tau_i$ comprise model parameters.

A conclusion that the tile has standard halftone is made if $score_{HT}>0$. The values of the 16 parameters, $\tau_0$ to $\tau_{15}$, are selected based on accurate halftone detection for a broad range of sample halftoned tiles from a corresponding range of scanned documents. A preferred set of values for the parameters $\tau_0$ to $\tau_{15}$, which were obtained by using an optimisation method to search the space of possible parameters and find a set of values that minimise a metric based on the number of errors made over a large test set of sample tiles, is presented in Table 2.

TABLE 2

| Parameter Index (i) | Parameter Value ($\tau_i$) |
| --- | --- |
| 0 | −0.0307 |
| 1 | −0.398 |
| 2 | −0.6541 |
| 3 | −0.3769 |
| 4 | −0.34 |
| 5 | 0.138 |
| 6 | 0.5747 |
| 7 | 0.5413 |
| 8 | 0.7129 |
| 9 | 0.6246 |
| 10 | 0.3839 |
| 11 | 0.1962 |
| 12 | 0.0771 |
| 13 | 0.0647 |
| 14 | −0.0958 |
| 15 | −0.0752 |

Figure 5E:
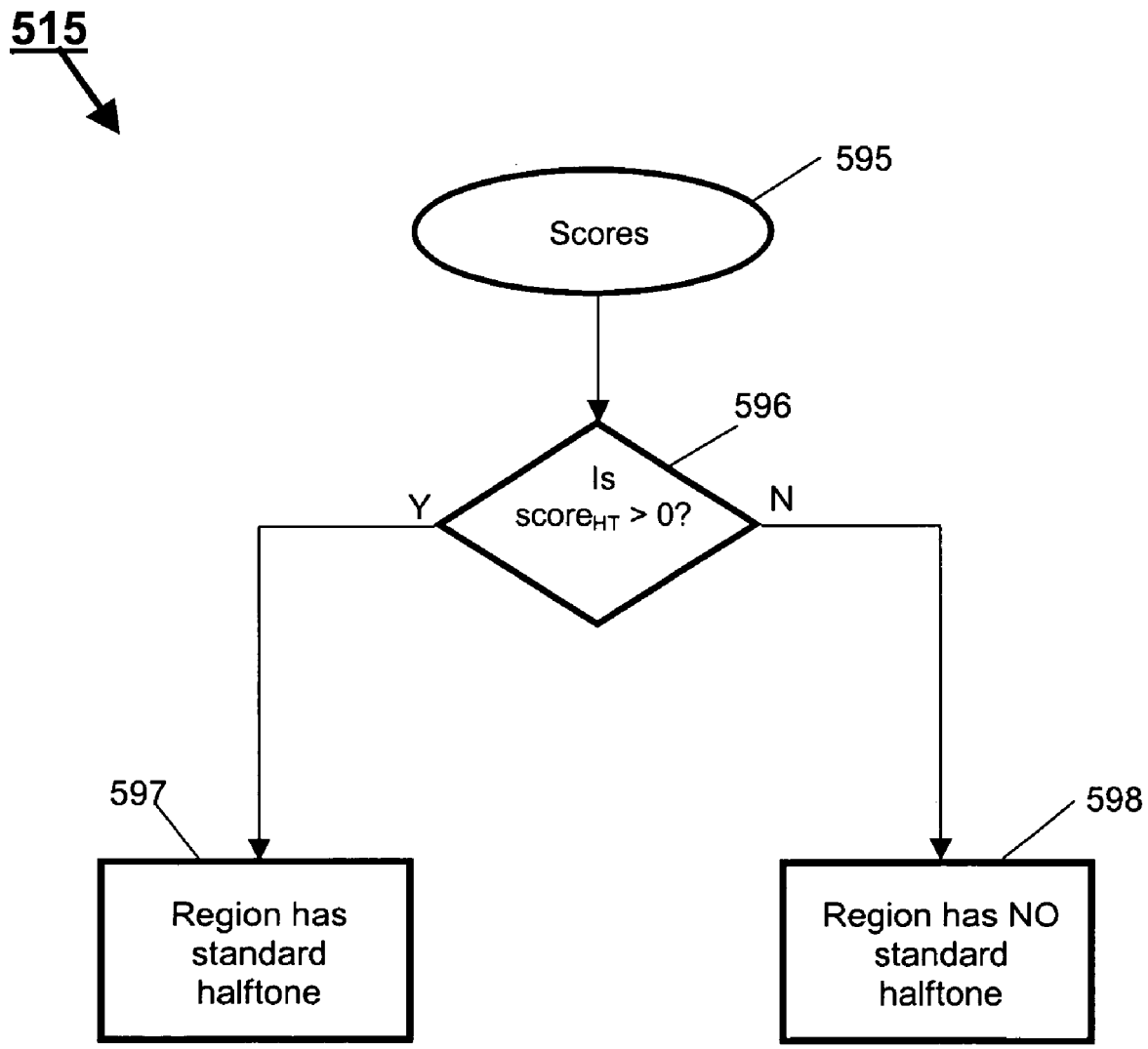
FIG. 5e is a flow diagram of another method for detecting the presence of standard halftone.

FIG. 5e shows a flow diagram of a method for evaluating scores derived from analysis of the 16 regions 650 denoted $R_0$ to $R_{15}$ in FIG. 6b to determine whether a current tile has standard halftone or not. The method of FIG. 5e may be used to perform step 515 of FIG. 5a. Referring to FIG. 5e, a determination is made at step 596 whether the halftone score 595 for a current tile, $score_{HT}$, is greater than zero. If step 596 returns (Y), a conclusion is made that the tile has standard halftone at step 597. If step 596 returns (N), a conclusion is made that the tile does not contain standard halftone at step 598.

Figure 10:
FIG. 10 shows an example of CLC halftoning.

Another kind of halftone that is considered or processed separately to standard halftone is the horizontal banding effect produced by Colour Laser Copiers (CLCs). This effect is a significant artefact that affects edge detection if not removed. FIG. 10 shows an example of CLC halftoning, which comprises a number of horizontal, dark bands across the image.

Figure 8:
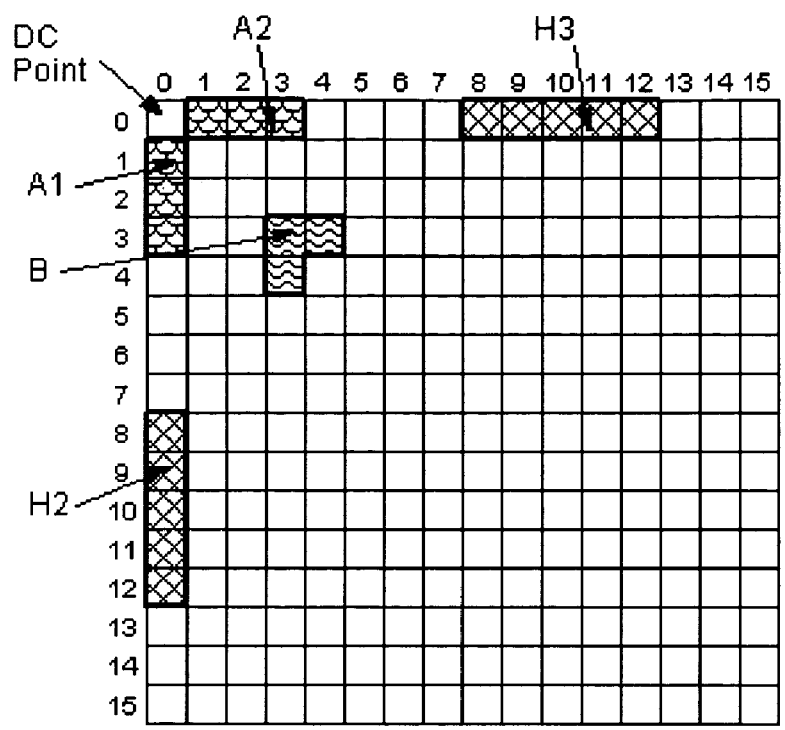
FIG. 8 is a representation of DCT regions analysed to detect CLC halftone.

FIG. 8 shows regions that are analysed to determine the presence or absence of CLC halftone artefacts. In particular, a strong peak on the vertical or horizontal axis is sought, as is shown in FIG. 8. The regions for CLC halftoning may be summarized as follows:

DC Point: This region represents the average value within the tile for the current channel.

$A_1,A_2$: These regions contain frequency components relating to slowly varying characteristics within the tile.

B: This region represents a frequency zone where a characteristic frequency dip is expected for a tile that contains both halftone and non-halftone regions.

$H_2, H_3$: These regions represent locations in which the characteristic peaks relating to the horizontal or vertical bands resulting from CLC halftoning are expected to lie.

The reason for the double regions $A_1, A_2$ and $H_2, H_3$ is that the scanning orientation for a CLC printed document is unknown. Thus, peaks must be checked for in both the horizontal and vertical directions.

Referring again to FIG. 5a, the region scores are obtained at step 510 as follows:

$$score_{A_1} = \max_j \hat{C}_j \quad j \in A_1$$

$$score_{H_2} = \max_j \hat{C}_j \quad j \in H_2$$

$$score_{A_2} = \max_j \hat{C}_j \quad j \in A_2$$

where: $A_1,A_2$ and $H_2,H_3$ comprise the regions $A_1,A_2$ and $H_2,H_3$ described hereinbefore with reference to FIG. 8. The calculated scores are evaluated to determine whether CLC halftone is present in step 515. A flag is used to detect which orientation the CLC banding is in, namely horizontal banding (HB) and vertical banding (VB). Evaluation of the calculated scores is performed based on the logical decisions contained in Table 3, hereinafter:

TABLE 3

| |
| --- |
| HB = ($score_{H_2} > \tau_1 score_{A_1}$ OR $score_{H_2} > \tau_4 score_B$) |
| VB = ($score_{H_3} > \tau_1 score_{A_2}$ OR $score_{H_3} > \tau_4 score_B$) |
| flag = (HB OR VB) |
| IF (flag == 1) |
|   IF (HB) |
|     return TILE HAS HORIZONTAL CLC HALFTONE |
|   ELSE |
|     return TILE HAS VERTICAL CLC HALFTONE |
|   END |
| ELSE |
|   return TILE HAS NO CLC HALFTONE |
| END |

$\tau_1$=0.9, $\tau_2$=1.0, $\tau_3$=0.6 and $\tau_4$=1.5 comprise preferred values for a specific embodiment of the method. The preferred values are derived from parameters that have been optimised to obtain good results based on a broad range of sample halftoned tiles and corresponding scanned images.

Figure 5F:
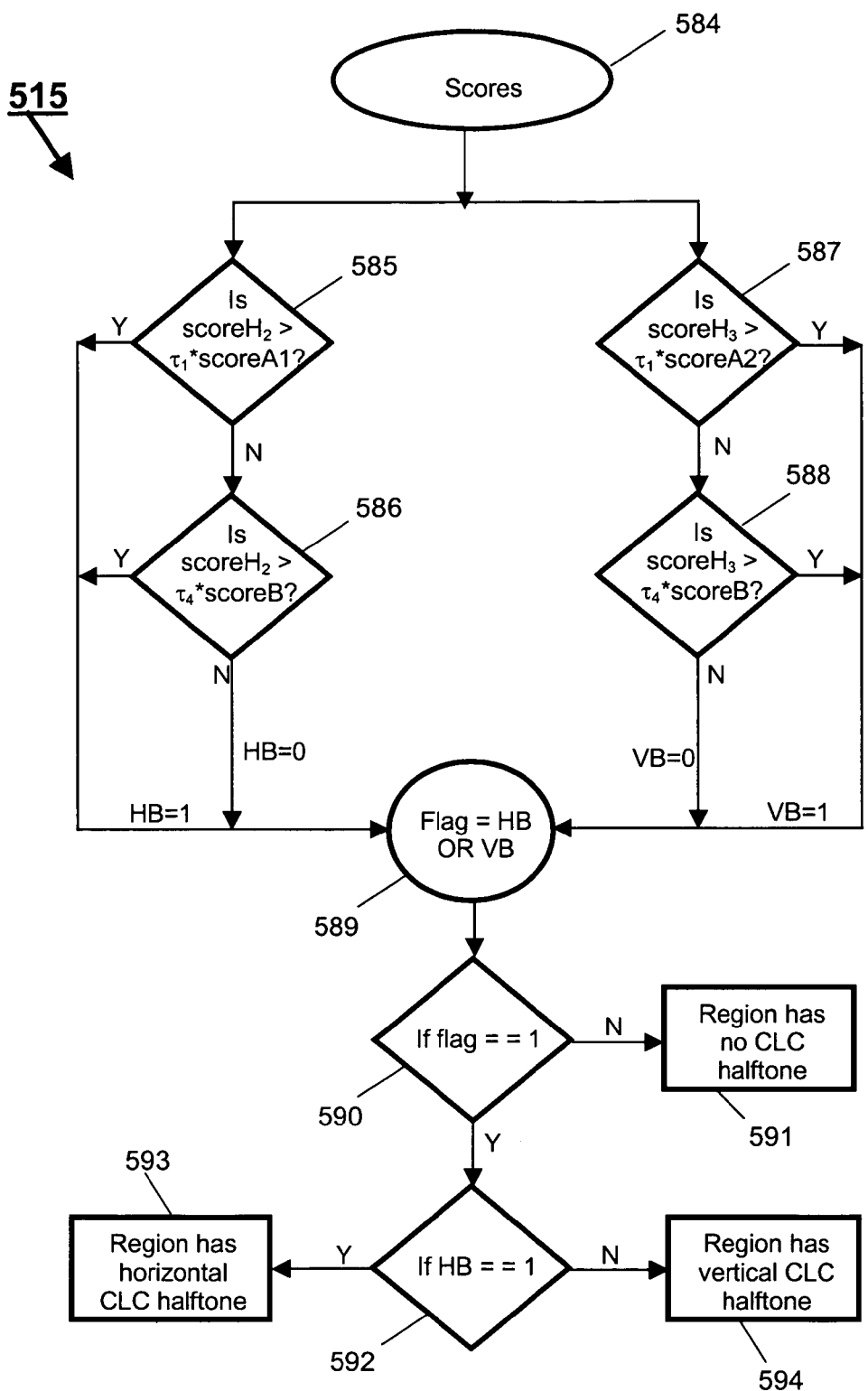
FIG. 5f is a flow diagram of a method for detecting the presence of halftone generated by a Colour Laser Copier (CLC)

FIG. 5f shows a flow diagram of a method using the logical decisions in Table 3 for evaluating scores 584 to determine whether a current tile has CLC halftone or not. The method of FIG. 5f may be used to perform step 515 of FIG. 5a. In this instance, the regions $A_1$, $A_2$, B, $H_2$, $H_3$ and DC refer to the regions $A_1$, $A_2$, B, $H_2$, $H_3$ and DC shown in FIG. 8.

Referring to FIG. 5f, a determination is made at step 585 whether the score for region $H_2$ is greater than the score for region $A_1$ multiplied by a factor $\tau_1$. If so (Y), a horizontal banding flag is set (HB=1) and processing continues at step 589. If not (N), a determination is made at step 586 whether the score for region $H_2$ is greater than the score for region B multiplied by a factor $\tau_4$. If so (Y), the horizontal banding flag is set (HB=1) and processing continues at step 589. If not (N), the horizontal banding flag is reset (HB=0) and processing continues at step 589.

A determination is also made at step 587 whether the score for region $H_3$ is greater than the score for region $A_2$ multiplied by a factor $\tau_1$. If so (Y), a vertical banding flag is set (VB=1) and processing continues at step 589. If not (N), a determination is made at step 588 whether the score for region $H_3$ is greater than the score for region B multiplied by a factor $\tau_4$. If so (Y), the vertical banding flag is set (VB=1) and processing continues at step 589. If not (N), the vertical banding flag is reset (VB=0) and processing continues at step 589.

At step 589, a combined flag is produced by logically OR-ing the horizontal banding (HB) and vertical banding (VB) flags. At step, 590, a determination is made whether the combined flag is set. If not (N), a conclusion is made that the current tile has no CLC halftone at step 591. If the combined flag is set (Y), a determination is made at step 592 whether the horizontal banding (HB) flag is set. If the HB flag is set (Y), a conclusion is made that the current tile has horizontal CLC halftone. If the HB flag is not set (N), a conclusion is made that the current tile has vertical CLC halftone.

In an alternative embodiment of a method for halftone detection, the parameters $\tau_i$ of the halftone detection models may be altered according to halftone information already known about the region surrounding the currently selected tile. This embodiment requires the storage of halftone detection flags as tiles are analysed.

The data may be analysed in a tile-based raster order using halftone information relating to tiles immediately adjacent to the currently selected tile to the left and above. Referring to FIG. 4, for example, the tiles adjacent to tile 420 are tiles 410 and 415. A context parameter context is generated by subtracting the number of adjacent tiles found not to contain halftone ($N_N$) from the number of adjacent tiles found to contain halftone ($N_Y$):

$$\text{context} = N_Y - N_N$$

The context parameter can take the values −2, −1, 0, 1 or 2, where the values −1 and +1 may only be assumed on the edges of the scanned image.

For standard halftone detection, modified parameters $\hat{\tau}_i$ may be generated according to the following equation:

$$\hat{\tau}_i = m^{context} \tau_i$$

The parameter m can take any value less than or equal to 1. A preferred value is m=0.8. The modified parameters appropriate to the context parameter for each tile are then used in the halftone detection stage of the method in place of the original parameters.

Alternative sets of parameters may be used for each of the five possible contexts. The parameters may be determined according to the parameter optimisation method described hereinbefore using a modified error metric for each context parameter. The choice of parameter sets used in determining the halftone content of a given tile is then based on the context parameter for that tile. A preferred set of parameters for each context is presented in Table 4.

TABLE 4

| Parameter Index | Preferred parameter values for context | | | | |
|---|---|---|---|---|---|
| | −2 | −1 | 0 | 1 | 2 |
| 0 | −0.1153 | −0.0892 | −0.0307 | 0.2125 | 0.3139 |
| 1 | −0.5571 | −0.4648 | −0.398 | −0.6369 | −0.754 |
| 2 | −0.742 | −0.654 | −0.6541 | −0.4705 | −0.3101 |
| 3 | −0.6776 | −0.599 | −0.3769 | −0.1903 | −0.3608 |
| 4 | −0.3937 | −0.3748 | −0.34 | 0.0213 | 0.0427 |
| 5 | 0.1847 | 0.27 | 0.138 | 0.5142 | 0.7218 |
| 6 | 0.4128 | 0.446 | 0.5747 | 0.7059 | 0.5225 |
| 7 | 0.4452 | 0.3798 | 0.5413 | 0.3769 | 0.5383 |
| 8 | 0.6098 | 0.6469 | 0.7129 | 0.5665 | 0.5952 |
| 9 | 0.5414 | 0.5441 | 0.6246 | 0.6342 | 0.5156 |
| 10 | 0.1444 | 0.0935 | 0.3839 | 0.3611 | 0.4436 |
| 11 | 0.0743 | 0.2756 | 0.1962 | 0.1257 | 0.195 |
| 12 | 0.0161 | −0.0455 | 0.0771 | −0.1448 | −0.1408 |
| 13 | −0.063 | −0.2941 | 0.0647 | −0.0659 | −0.1219 |
| 14 | −0.0932 | 0.0108 | −0.0958 | −0.3057 | −0.3598 |
| 15 | −0.1531 | −0.1549 | −0.0752 | −0.5177 | −0.4668 |

Thus, halftone in a currently selected tile may be detected according to the halftoning present in previously processed tiles by selecting alternative values of the parameters for the halftone detection method. In other embodiments the processing methods for alternative contexts may differ more fundamentally than simply in terms of these parameters.

The likelihood of detecting halftone in a current tile is increased if halftone was detected in surrounding tiles and the likelihood of detecting halftone in a current tile is reduced if halftone was not detected in surrounding tiles. This can advantageously enable a more accurate classification in scanned images where halftone is typically found in regions that cover a large number of tiles by taking advantage of the spatial correlation properties of the halftone over the entire image.

FIG. 5b shows a flow diagram of a method for preparing or selecting a frequency mask for halftone removal, which may be used in step 345 of FIG. 3. The halftone detection results for all three colour channels 521 are passed to this stage. By default, the mask region is set as a "NO MASK" (i.e., the mask region is an empty set) at step 520. This means that no DCT coefficients are set to the preferred value of 0 by default.

Figure 7:
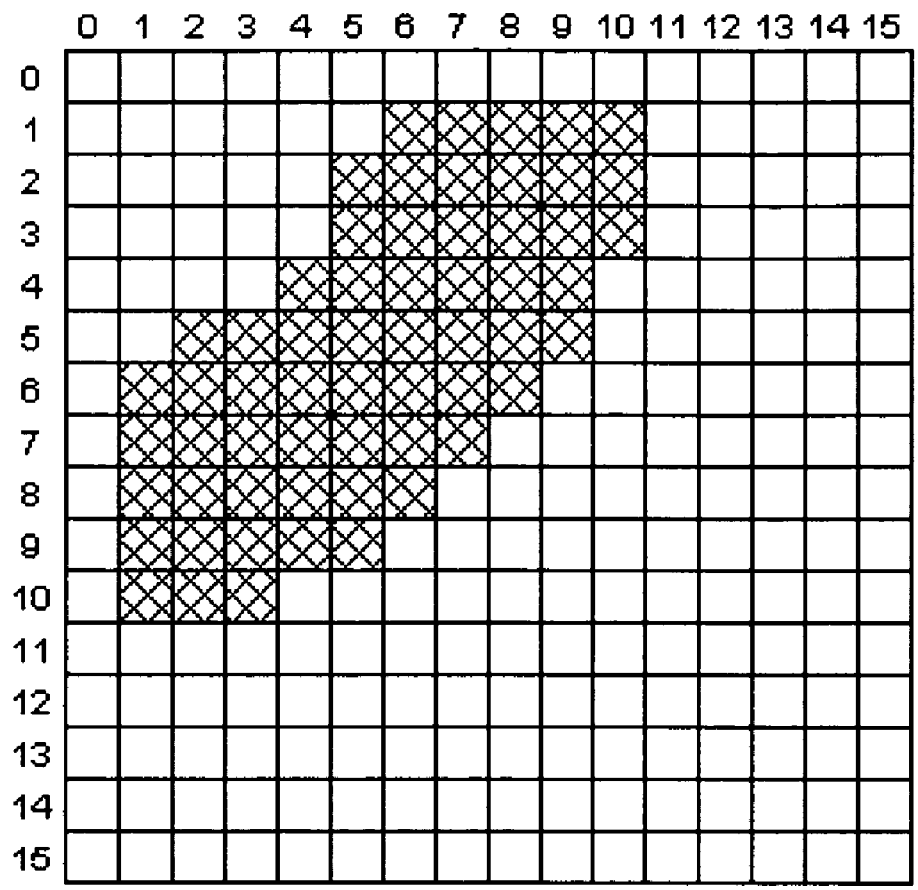
FIG. 7 is a representation of a standard halftone mask for a 16×16 pixel DCT.

At step 525, a determination is made whether standard halftone is present in any of the colour channels. If standard halftone is present in any of the channels (Y), the mask is set to include the hatched region shown in FIG. 7 in step 530. Processing then continues at step 535. Alternatively, if standard halftone is not present in any of the channels (N), processing continues at step 535. The hatched pixel positions in FIG. 7 correspond to the locations for the DCT coefficients that are set to the preferred value of 0. This mask region is set for all channels, not just the channel/s that standard halftone is detected in. The reason for this is that if masking is not performed on all the colour channels, undesirable artefacts may be produced in the final image.

Figure 9:
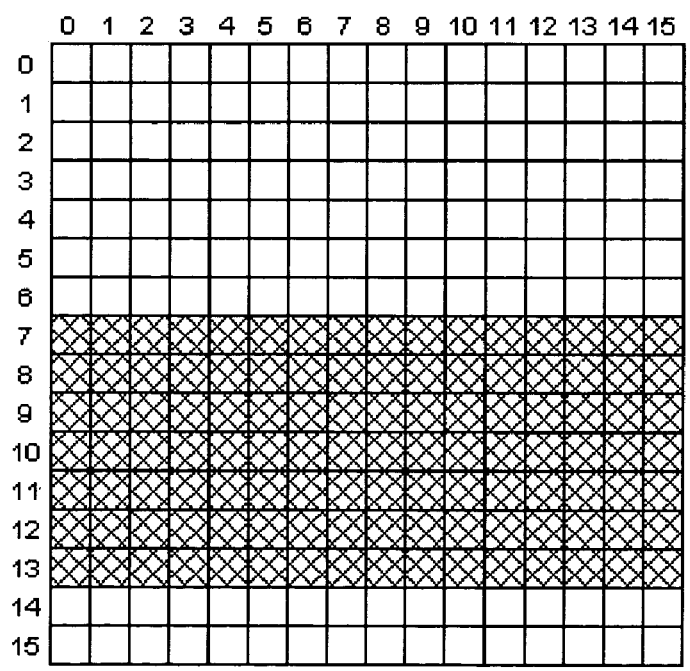
FIG. 9 is a representation of a CLC halftone mask for a 16×16 pixel DCT.

At step 535, a determination is made whether a CLC halftone (horizontal or vertical) is present in any of the channels. If a CLC halftone is present in any of the channels (Y), the mask region is set to also include the CLC halftone mask at step 540. The CLC halftone mask is shown in FIG. 9 for the case of horizontal halftone (HB=1, VB=0). The mask shown in FIG. 9 can simply be rotated through 90 degrees in an anti-clockwise direction for the case of vertical CLC halftone (VB=1, HB=0). The hatched pixel positions indicate the locations of the DCT coefficients that are set to the preferred value of 0. If a CLC halftone is not present in any of the channels (N), the final mask combination 541 does not include the CLC halftone mask.

FIG. 5c shows a method for removing halftone from a colour channel by application of a DCT frequency mask, which may be used in each of steps 350, 355 and 360 of FIG. 3. The predetermined mask is applied to the DCT coefficients for a current channel 546 at step 545 as follows:

$$C_i = 0 \; i \in M$$

where: M is the mask region determined in step 345 of FIG. 3. All other coefficients not covered by the mask region are left unchanged.

At step 550, an inverse DCT is applied to the masked array of DCT coefficients, which converts the tile, for the current colour channel, back to the spatial domain. The masking procedure effectively implements a band-stop filter in 2 dimensions over the range of dominant halftone frequency components and provides a dehalftoned tile for the current colour channel 551.

Figure 16A:
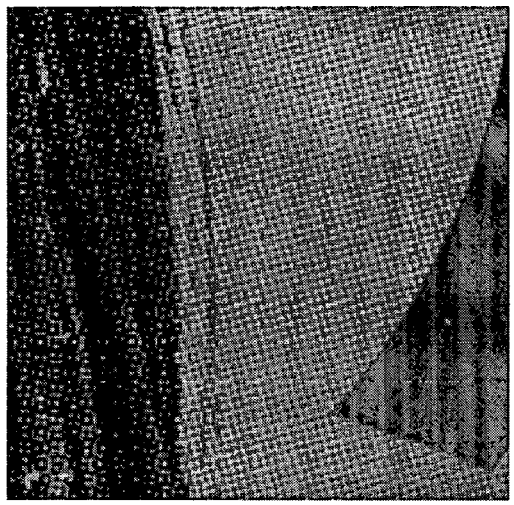
FIG. 16a shows an image which has been subjected to clustered-dot halftoning.
Figure 16B:
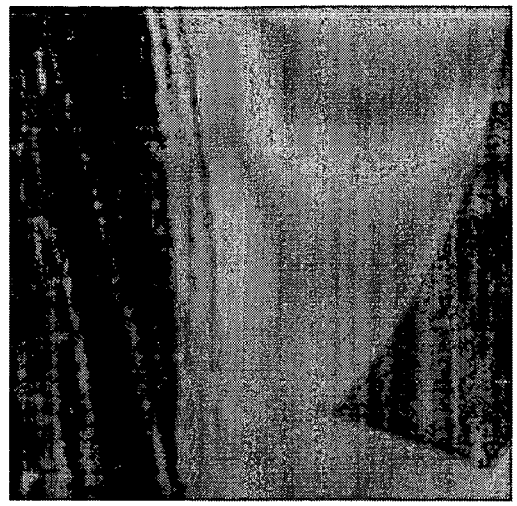
FIG. 16b shows the image of FIG. 16a with the halftoning removed.
Figure 17A:
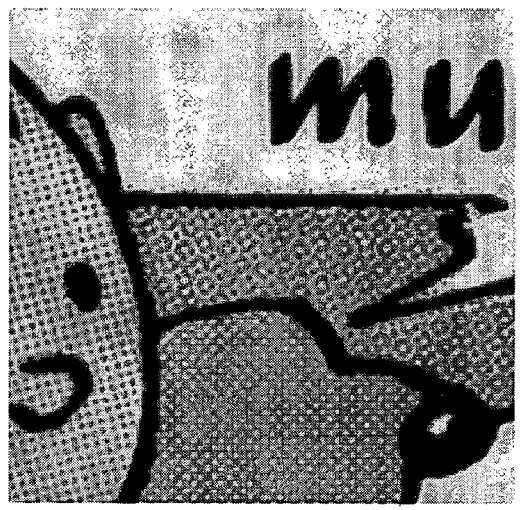
FIG. 17a shows another image which has been subjected to clustered-dot halftoning.
Figure 17B:
FIG. 17b shows the image of FIG. 17a with the halftoning removed.

FIGS. 16b and 17b are representations produced by the application of an embodiment of the present invention to the images of FIGS. 16a and 17a, respectively. As can be seen, the clustered-dot halftoning that is present in FIGS. 16a and 17a is removed or ameliorated in FIGS. 16b and 17b, respectively. The process generally leaves areas without halftone untouched and filters areas that contain both halftone and non-halftone in a way that removes the halftone whilst preserving most of the high frequency edge information.

Figure 18A:
FIG. 18a shows an image with horizontal banding due to CLC halftoning.
Figure 18B:
FIG. 18b shows the image of FIG. 18a with the CLC halftoning removed.

Results for removal of CLC artefacts using an embodiment of the present invention are shown in FIG. 18. FIG. 18a is a representation of the original image with CLC artefacts and FIG. 18b is a representation of the image with the CLC artefacts removed. As can be seen, the process removes most of the banding effect to provide a good approximation of the original image.

Dispersed-dot halftoning artefacts such as those produced by an ink-jet printer are typically only visible at much higher resolutions than the examples in the accompanying figures. In such cases the effect of applying an embodiment of the present invention is virtually indistinguishable at the resolution of the examples in the accompanying figures.

In an alternative embodiment to that shown in FIG. 5b, halftone detection and removal may be carried out on the original spatial data rather than the spectral DCT data. The spatial data may be smoothed by convolution with a suitable two-dimensional smoothing function such as a Gaussian or top-hat. This process blurs the clustered-dot halftoning, but may have a more detrimental effect on edges in halftoned regions.

Figure 20:
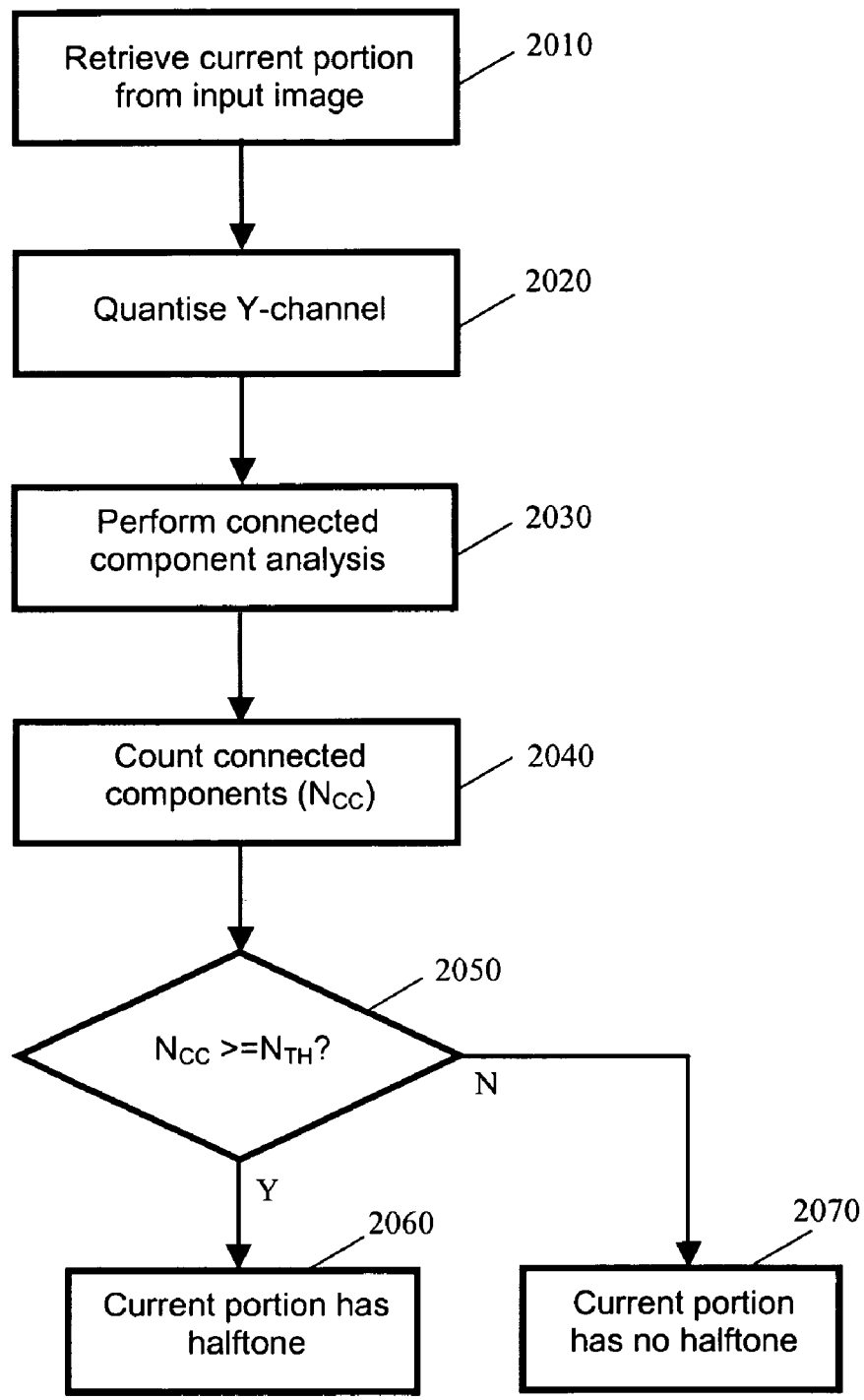
FIG. 20 is a flow diagram of a method for detecting halftone in a portion of an image based on spatial characteristics within the portion.

FIG. 20 is a flow diagram of another method for detecting halftone from a portion of an image based on spatial characteristics within the portion. In the embodiment described hereinafter, the input data for a current portion is in a 8-bit YUV colour format, where Y is the intensity channel and U and V are the chrominance channels. A preferred portion or region size is 32×32 pixels for a 600 dpi resolution. However, other sizes of portion and/or other resolutions may be practiced.

Data relating to a current or selected tile or portion is retrieved at step 2010. The image may be arranged into bands each comprising a predetermined number of consecutive lines of pixels, each of the bands may be arranged into tiles of pixels and one of the tiles may be selected as a current portion. The data may be retrieved from an input image buffer for storing colour data relating to a current or selected portion. The colour channels in the data may be interleaved with each other for all pixels.

The Y-channel data is quantised at step 2020. The Y-channel data may comprise a byte for each pixel that is quantised by right-shifting the three most significant bits (MSB) by five bits. The output byte generated by each shift operation may be stored in a separate Y-channel buffer, which needs to be large enough to store one byte of information for each pixel in the current portion. The shifting operation may be represented by the following statement in pseudo code:

$$B_Y[i] = B[N_{CHAN}*i + Y_{OFFSET}] >> 5$$

where:
$B_Y$ is the Y-channel buffer,
B is the input image buffer,
$N_{CHAN}$ is the number of colour channels for the input colour data,
$Y_{OFFSET}$ is an offset into each block of channels for retrieving the Y value for each pixel from the input image buffer B,
i is a loop variable, and
>> represents a right shift function.

The result of the shifting operation is that the Y-channel buffer $B_Y$ will be filled with byte values ranging from 0 to 7.

The foregoing data scheme and method of quantisation represent an embodiment of the present invention and those skilled in the relevant art would realise that various other data schemes and methods of quantisation may alternatively be used to perform step 2020.

A connected component analysis is performed at step 2030 to identify connected components (CC) within the Y-channel buffer $B_Y$. The connected component analysis may be performed once the Y-channel buffer $B_Y$ has been filled. In the present embodiment, pixels having the same value and that are immediately above, below, to the left or to the right of each other (i.e., adjacent to one another) are defined as belonging to the same connected component. Pixels that only touch a corner of another pixel are not part of the same CC. A separate label buffer $B_L$ may be used to hold the connected component labels with sufficient memory for storing 16 bit integers per pixel, in case of large CCs. The CCs may be identified in a two-pass routine over the Y-channel buffer $B_Y$. A 16-bit label c is used to identify each new CC, where c is preferably initialised to a value of 0. In the first pass, each of the pixels is considered once by moving in spatial row order from top to bottom, moving from left to right. For each pixel in the Y-channel buffer $B_Y$, a corresponding CC label c is written to the label buffer $B_L$. If neither of the pixels to the left of or above the current CC has the same value in the Y-channel buffer $B_Y$, then the pixel is allocated to a new CC by being allocated the value of c, which is then incremented for the next CC. If either of the pixels to the left of or above the current CC has the same value, the pixel is allocated the same CC value as that/those pixel/s. If both the pixels to the left of and above the current CC have the same value in the Y-channel buffer $B_Y$, but have different corresponding CC labels in the label buffer $B_L$ (as would happen at the base of a U-shape, for instance), then the current pixel is first allocated the CC label for the left pixel. A reference is stored such that the CC label for the left pixel is identified as part of the same CC as the CC label for the pixel above the current pixel. This may be achieved by storing a mapping structure for each new CC label, such as is shown in the pseudo code in Table 5 below:

TABLE 5

```
typedef struct blb_MapNode
{
    struct blb_MapNode   *mn_MapTo;
    unsigned int        mn_CCLabel;
}
blb_MapNode;
``` where:
mn_CCLabel is the CC label that the previous label is being set to be equivalent to, and
mn_MapTo is a pointer to the structure that holds mn_CCLabel.

When a new CC is generated, the CC's structure is initialised by setting mn_CCLabel to the value of c and setting mn_MapTo to NULL. On account of the mapping system, in each case when a CC label is being examined from a previous pixel, the "active" CC label must be identified. In other words, a CC from a previous pixel may already have been mapped to another CC, so it is necessary to check the most recent CC a pixel is allocated to. This may be done by following the link mn_MapTo until a node for which mn_MapTo is equal to NULL is reached. When the current pixel is in the upper left corner of the Y-channel buffer $B_Y$, the current pixel is automatically assigned a new CC label. For other pixels in the first row, only the pixel to the left of the current pixel is examined. For pixels in the first column, only the pixel above the current pixel is examined. Once this process is completed for each pixel, the first pass is complete.

A second pass is taken over all the pixels to resolve the CC mappings. In the second pass, a counter $N_{CC}$ is used to accumulate the number of final unique CCs in the current portion at step 2040. This effectively counts those CCs for which a corresponding mn_MapTo pointer is equal to NULL.

At step 2050, a determination is made whether the number of CCs ($N_{CC}$) determined in step 2040 is greater than or equal to a threshold parameter $N_{TH}$. If the number of CCs ($N_{CC}$) is greater than or equal to the threshold parameter $N_{TH}$ (Y), the current portion is determined to contain halftone at step 2060. If not (N), at step 2050, it is determined that the current portion does not contain halftone at step 2070.

Due to spatial characteristics of areas of halftone, a portion containing halftone is expected to have a large number of CCs and a portion containing no halftone is expected to have a small number of CCs. A preferred value of $N_{CC}$ is 6, at which point the probability of false positives (cases where halftone is determined for portions that contain no halftone) is roughly equal to the number of false negatives (cases where halftone is not determined for portions that contain halftone) for a representative set of test data.

In an alternative embodiment of the method of FIG. 20, all three colour channels are quantised. This embodiment preferably inputs RGB data and quantises the colour data to 1 bit per channel by selecting the most significant bit in each channel. The connected component analysis described above is carried out for each channel and the number of CCs is stored. The parameter $N_{CC}$ is representative of the maximum number of CCs found in any of the three channels, according to the following equation:

$$N_{CC} = \max(N_{CC}^R, N_{CC}^G, N_{CC}^B)$$

As described hereinbefore with respect to another embodiment, halftone is detected if the parameter $N_{CC}$ is greater than or equal to a threshold value $N_{TH}$, which may take a preferred value of 7.

In yet another embodiment, the spatial halftone detection methods described hereinbefore are modified to incorporate information from raster order context. Essentially, the threshold parameter is increased for tiles with adjacent tiles that have previously been found to contain halftone and is decreased for tiles where adjacent, previously analysed tiles have been found not to contain halftone. For example, by using a parameter context that can take values in the range $-2 \leq \text{context} \leq 2$, a modified threshold parameter $N_{TH}^{ctxt}$ can be generated as follows:

$$N_{TH}^{ctxt} = N_{TH} - 2 \times \text{context}.$$

As described hereinbefore, halftone is detected within a tile if $N_{CC} > N_{TH}^{ctxt}$.

Halftone detected using the foregoing spatially-based methods may be removed using either spectral DCT data or spatial data relating to the image, as described hereinbefore. For example, a frequency mask may be applied after converting the original image data to the frequency domain or the original image data may be smoothed by convolution using a two-dimensional smoothing function such as a Gaussian or top-hat.

Embodiments of methods, apparatuses and computer program products for detecting and/or removing halftone from scanned documents have been disclosed herein. The embodiments have been described primarily in relation to removal of clustered dot halftoning as opposed to dispersed dot halftoning, which is commonly used on ink-jet printers. This is because the printing resolution of modern ink-jet printers is such that the halftone effects are virtually non-existent. Notwithstanding, the results obtained from embodiments of the present invention demonstrate that the embodiments do help in suppressing some artefacts that result from dispersed dot halftoning.

The foregoing description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

TABLE A

DERIVATION OF DCT GENERAL MASK REGION

To fully determine the characteristics of pure halftone in the Discrete Cosine Transform (DCT) domain, and thus mask out these characteristics, it is desirable to mathematically model halftone, as well as the DCT transform, in the continuous space.

To simulate the DCT operation in continuous space, the continuous Fourier-cosine transform is applied, which can be expressed in two dimensions as:

$$F_c(u, v) = \iint f(x, y)\cos(ux)\cos(vy)dxdy$$

where: $f(x, y)$ is the original signal in the spatial domain.

To simulate a regular screened halftone signal, $f(x, y)$ is modelled as:

$$f(x, y) = \sin(k_1 x + k_2 y)\sin(-k_2 x + k_1 y)$$

for $k_1 = \omega_0 \cos\theta$ and $k_2 = \omega_0 \sin\theta$ where: $\omega$ is the halftone screen frequency, and
$\theta$ is the angle of screening.

Figure 11:
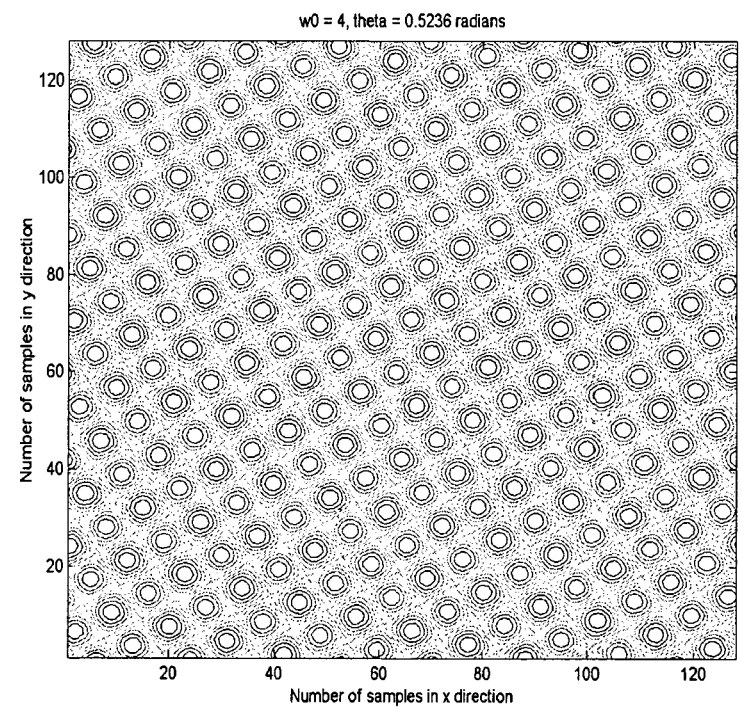
FIG. 11 is a contour plot of an example of a halftone signal generated by a mathematical model.

An example of a signal representing halftone based on this model, is shown in FIG. 11. Given this model, the indefinite integral for $F_c(u, v)$ evaluates to a complex function given as:

$$F_c(u, v) = P_x P_y + Q_x Q_y + R_x R_y + S_x S_y$$

where:

$$P_x = -\frac{\sin(\alpha_1 x)}{4\alpha_1} + \frac{\sin(\alpha_2 x)}{4\alpha_2} - \frac{\sin(\alpha_3 x)}{4\alpha_3} + \frac{\sin(\alpha_4 x)}{4\alpha_4}$$

$$P_y = +\frac{\sin(\beta_1 y)}{4\beta_1} + \frac{\sin(\beta_2 y)}{4\beta_2} + \frac{\sin(\beta_3 y)}{4\beta_3} + \frac{\sin(\beta_4 y)}{4\beta_4}$$

$$Q_x = -\frac{\cos(\alpha_1 x)}{4\alpha_1} + \frac{\cos(\alpha_2 x)}{4\alpha_2} - \frac{\cos(\alpha_3 x)}{4\alpha_3} + \frac{\cos(\alpha_4 x)}{4\alpha_4}$$

$$Q_y = +\frac{\cos(\beta_1 x)}{4\beta_1} - \frac{\cos(\beta_2 x)}{4\beta_2} + \frac{\cos(\beta_3 x)}{4\beta_3} - \frac{\cos(\beta_4 x)}{4\beta_4}$$

$$R_x = -\frac{\cos(\alpha_1 x)}{4\alpha_1} - \frac{\cos(\alpha_2 x)}{4\alpha_2} - \frac{\cos(\alpha_3 x)}{4\alpha_3} - \frac{\cos(\alpha_4 x)}{4\alpha_4}$$

$$R_y = -\frac{\cos(\beta_1 x)}{4\beta_1} - \frac{\cos(\beta_2 x)}{4\beta_2} - \frac{\cos(\beta_3 x)}{4\beta_3} - \frac{\cos(\beta_4 x)}{4\beta_4}$$

$$S_x = +\frac{\sin(\alpha_1 x)}{4\alpha_1} + \frac{\sin(\alpha_2 x)}{4\alpha_2} + \frac{\sin(\alpha_3 x)}{4\alpha_3} + \frac{\sin(\alpha_4 x)}{4\alpha_4}$$

$$S_y = +\frac{\sin(\beta_1 y)}{4\beta_1} - \frac{\sin(\beta_2 y)}{4\beta_2} + \frac{\sin(\beta_3 y)}{4\beta_3} - \frac{\sin(\beta_4 y)}{4\beta_4}$$

where:

$\alpha_1 = \omega_0 \cos\theta - \omega_0 \sin\theta - u$ $\alpha_2 = \omega_0 \cos\theta + \omega_0 \sin\theta - u$ $\alpha_3 = \omega_0 \cos\theta - \omega_0 \sin\theta + u$ $\alpha_4 = \omega_0 \cos\theta + \omega_0 \sin\theta + u$ $\beta_1 = \omega_0 \cos\theta - \omega_0 \sin\theta - v$ $\beta_2 = \omega_0 \cos\theta + \omega_0 \sin\theta - v$ $\beta_3 = \omega_0 \cos\theta - \omega_0 \sin\theta + v$ $\beta_4 = \omega_0 \cos\theta + \omega_0 \sin\theta + v$ Thus, a continuous estimate of the DCT function for any value of halftone parameters $\omega_0$ and $\theta$ can be derived. The surface plot shown in FIG. 12 illustrates an example of a continuous Fourier-Cosine transform performed on a synthesized halftone signal. As can be seen, the function is extremely complex with many local maxima and minima.

FIGS. 13a and 13b show comparative density plots of DCT and continuous cosine outputs for the same synthesized halftone input signal, which provides an indication of how well the Cosine transform models the DCT output.

Figure 14:
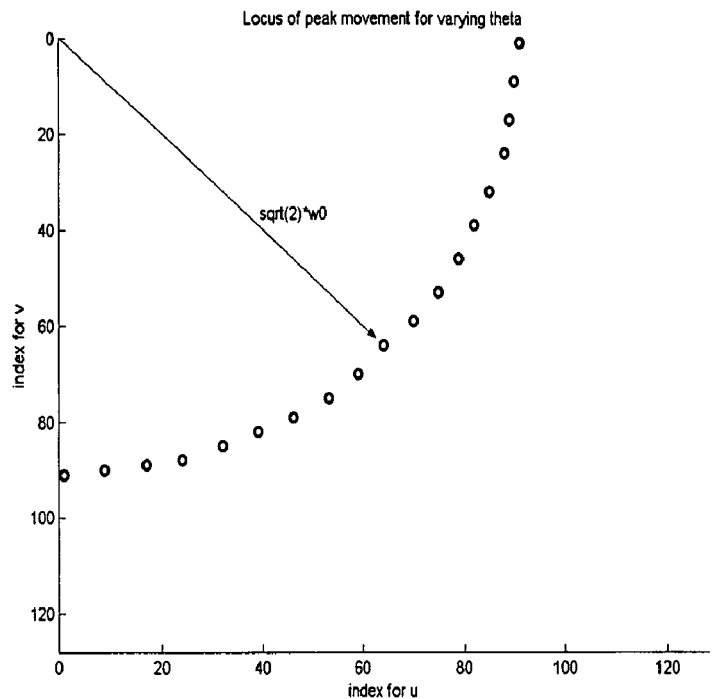
FIG. 14 is a plot of the behaviour of Fourier Cosine peaks for fixed $\omega_0$ and varying $\theta$.

Whilst a function to express the peak locations as a function of $\omega_0$ and $\theta$ could be determined by examining the critical points via first and second derivatives, the sheer complexity of the equations would make this a highly time consuming task. However, as only an estimate of the peak behaviour is required, a numerical analysis was applied to the function for various values of $\omega_0$ and $\theta$. The results of the numerical analysis clearly show that the dominant peaks of the Cosine transform move roughly along a circle of radius $\sqrt{2}\omega_0$, with the centre of the circle being (u=0, v=0). This behaviour is illustrated in the graph shown in FIG. 14, wherein $\theta$ is varied for a fixed $\omega_0$ and the peak positions are plotted.

Figure 15:
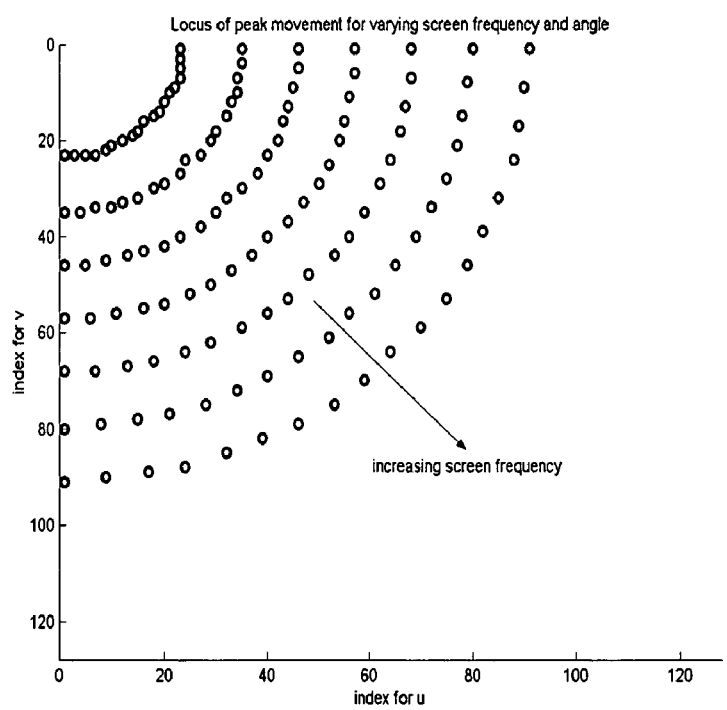
FIG. 15 is a plot of the behaviour of Fourier Cosine peaks for varying $\omega_0$ and $\theta$.

To more fully illustrate the peak behaviour, the graph in FIG. 15 shows both $\omega_0$ and $\theta$ being varied. It can clearly be seen that the peaks all lie on circular arcs for a particular value of screen frequency. The foregoing observation forms the basis for the DCT mask shown in FIG. 7. In this case, the mask is the same area as the region $H_1$ where the halftone peaks are expected to lie.

In the case of CLC "halftone", the mask shown in FIG. 9 is effectively the same as applying a band-stop filter along each column to remove the horizontal frequency relating to the banding effect which appears.

We claim:

1. A method for processing an image to detect halftone, said method comprising the steps of:
   arranging said image into a plurality of bands each comprising a predetermined number of consecutive lines of pixels;
   arranging each of said plurality of bands into a plurality of tiles of pixels;
   selecting one of said plurality of tiles as a selected portion;
   processing data relating to said selected portion, said processing comprising the sub-steps of:
   quantizing data relating to said pixels in said selected portion;
   assigning pixels that have the same value and that are adjacent to one another in said selected portion to a connected component;
   determining the number of unique connected components in said selected portion; and
   comparing said number of unique connected components to a threshold value; and
   detecting halftone present in said selected portion based on a result of said processing step and on a result of processing at least one other portion of said image.

2. A method as claimed in claim 1, wherein said halftone is detected based on spatial characteristics within said selected portion.

3. A method as claimed in claim 1, wherein said step of detecting halftone in said selected portion is based on a result of said comparison.

4. A method as claimed in claim 3, wherein said threshold value is six.

5. A method as claimed in claim 3, wherein said threshold value is increased when at least one portion adjacent to said selected portion contains halftone and said threshold value is decreased when at least one portion adjacent to said selected portion contains no halftone.

6. A method as claimed in claim 3, wherein said step of quantizing comprises the steps of:
   quantizing data relating to each of a plurality of colour channels for said selected portion;
   determining the number of unique connected components for each of said plurality of colour channels; and
   setting said threshold value equal to the maximum of the numbers of unique connected components for each of said plurality of colour channels.

7. A method as claimed in claim 6, wherein said threshold value is seven.

8. A method as claimed in claim 6, wherein said threshold value is increased when at least one portion adjacent to said selected portion contains halftone and said threshold value is decreased when at least one portion adjacent to said selected portion contains no halftone.

9. A method as claimed in any one of claims 1, 2 and 3 to 8, comprising the further step of removing said detected halftone.

10. A method as claimed in claim 1, wherein said halftone is detected based on frequency characteristics within said selected portion.

11. A method as claimed in claim 1, wherein said processing step comprises the substeps of:
    generating a frequency domain representation of each of a plurality of colour channels relating to said selected portion; and
    processing data relating to predetermined regions in said frequency domain representations.

12. A computer program product comprising a computer readable medium comprising a computer program recorded therein for processing an image to detect halftone, said computer program product comprising:
    computer program code for arranging said image into a plurality of bands each comprising a predetermined number of consecutive lines of pixels;
    computer program code for arranging each of said plurality of bands into a plurality of tiles of pixels;
    computer program code for selecting one of said plurality of tiles as a selected portion;
    computer program code for processing data relating to said selected portion, said code for processing comprising:
    computer program code for quantizing data relating to said pixels in said selected portion;
    computer program code for assigning pixels that have the same value and that are adjacent to one another in said selected portion to a connected component;
    computer program code for determining the number of unique connected components in said selected portion; and
    computer program code for comparing said number of unique connected components to a threshold value; and computer program code for detecting halftone present in said selected portion based on a result of said processing step and on a result of processing at least one other portion of said image.

13. A computer program product as claimed in claim 12, wherein said halftone is detected based on spatial characteristics within said selected portion.

14. A computer program product as claimed in claim 12, wherein said computer program code for detecting halftone in said selected portion is based on a result of said comparison.

15. A computer program product as claimed in claim 14, wherein said threshold value is six.

16. A computer program product as claimed in claim 14, wherein said threshold value is increased when at least one portion adjacent to said selected portion contains halftone and said threshold value is decreased when at least one portion adjacent to said selected portion contains no halftone.

17. A computer program product as claimed in claim 14, wherein said computer program code for quantizing comprises:
   computer program code for quantizing data relating to each of a plurality of colour channels for said selected portion;
   computer program code for determining the number of unique connected components for each of said plurality of colour channels; and
   computer program code for setting said threshold value equal to the maximum of the numbers of unique connected components for each of said plurality of colour channels.

18. A computer program product as claimed in claim 17, wherein said threshold value is seven.

19. A computer program product as claimed in claim 17, wherein said threshold value is increased when at least one portion adjacent to said selected portion contains halftone and said threshold value is decreased when at least one portion adjacent to said selected portion contains no halftone.

20. A computer program product as claimed in any one of claims 12, 13 and 14 to 19, further comprising computer program code for removing said detected halftone.

21. A computer program product as claimed in claim 12, wherein said halftone is detected based on frequency characteristics within said selected portion.

22. A computer program product as claimed in claim 12, wherein said computer program code for processing comprises:
   computer program code for generating a frequency domain representation of each of a plurality of colour channels relating to said selected portion; and
   computer program code for processing data relating to predetermined regions in said frequency domain representations.

23. A computer program product as claimed in claim 22, further comprising computer program code for determining a category of each said frequency domain representation, wherein said category is selected from the group of categories consisting of:
   said frequency domain representation comprises no halftone;
   said frequency domain representation comprises only halftone; and
   said frequency domain representation comprises halftone and non-halftone portions.

24. A computer program product as claimed in claim 22, further comprising:
   computer program code for preparing a frequency mask based on a result of processing data relating to said predetermined regions;
   computer program code for applying said frequency mask to at least one of said predetermined regions in said frequency domain representations of said selected portion; and
   computer program code for converting said frequency domain representations to a spatial domain representation.

25. A computer program product as claimed in claim 24, wherein said frequency mask is prepared based on one or more halftone categories detected in said selected portion, said one or more halftone categories selected from the group of halftone categories consisting of:
   standard halftone; and
   colour laser copier (CLC) halftone.

26. A computer program product as claimed in claim 24, wherein said frequency mask comprises a band-stop filter for removing dominant halftone frequency components.

27. A computer program product as claimed in claim 24, wherein at least one predetermined region in each of said colour channels is masked irrespective of whether halftone is detected in each of said colour channels.

28. An apparatus for processing an image to detect halftone, said apparatus comprising:
   a memory for storing data and instructions to be performed by a processing unit; and
   a processing unit coupled to said memory unit, said processing unit being programmed to:
   arrange said image into a plurality of bands each comprising a predetermined number of consecutive lines of pixels;
   arrange each of said plurality of bands into a plurality of tiles of pixels;
   select one of said plurality of tiles as a selected portion;
   quantize data relating to said pixels in said selected portion;
   assign pixels that have the same value and that are adjacent to one another in said selected portion to a connected component:
   determine the number of unique connected components in said selected portion;
   compare said number of unique connected components to a threshold value; and
   detect halftone present in said selected portion based on a result of said processing step and on a result of processing at least one other portion of said image.

29. An apparatus as claimed in claim 28, wherein said halftone is detected based on spatial characteristics within said selected portion.

30. An apparatus as claimed in claim 28, wherein said processing unit is programmed to detect halftone in said selected portion based on a result of said comparison.

31. An apparatus as claimed in claim 30, wherein said threshold value is six.

32. An apparatus as claimed in claim 30, wherein said threshold value is increased when at least one portion adjacent to said selected portion contains halftone and said threshold value is decreased when at least one portion adjacent to said selected portion contains no halftone.

33. An apparatus as claimed in claim 30, wherein said processing unit is programmed to:
   quantize data relating to each of a plurality of colour channels for said selected portion;
   determine the number of unique connected components for each of said plurality of colour channels; and set said threshold value equal to the maximum of the numbers of unique connected components for each of said plurality of colour channels.

34. An apparatus as claimed in claim 33, wherein said threshold value is seven.

35. An apparatus as claimed in claim 33, wherein said threshold value is increased when at least one portion adjacent to said selected portion contains halftone and said threshold value is decreased when at least one portion adjacent to said selected portion contains no halftone.

36. An apparatus as claimed in any one of claims 28, 29 and 30 to 35, wherein said processing unit is further programmed to remove said detected halftone.

37. An apparatus as claimed in claim 28, wherein said processing unit is programmed to detect halftone based on frequency characteristics within said selected portion.

38. An apparatus as claimed in claim 28, wherein said processing unit is programmed to:
  generate a frequency domain representation of each of a plurality of colour channels relating to said selected portion; and
  process data relating to predetermined regions in said frequency domain representations.

39. An apparatus as claimed in claim 38, wherein said processing unit is programmed to determine a category of each said frequency domain representation, wherein said category is selected from the group of categories consisting of:
  said frequency domain representation comprises no halftone;
  said frequency domain representation comprises only halftone; and
  said frequency domain representation comprises halftone and non-halftone portions.

40. An apparatus as claimed in claim 38, wherein said processing unit is further programmed to:
  prepare a frequency mask based on a result of processing data relating to said predetermined regions;
  apply said frequency mask to at least one of said predetermined regions in said frequency domain representations of said selected portion; and
  convert said frequency domain representations to a spatial domain representation.

41. An apparatus as claimed in claim 40, wherein said frequency mask is prepared based on one or more halftone categories detected in said selected portion, said one or more halftone categories selected from the group of halftone categories consisting of:
  standard halftone; and
  colour laser copier (CLC) halftone.

42. An apparatus as claimed in claim 40, wherein said frequency mask comprises a band-stop filter for removing dominant halftone frequency components.

43. An apparatus as claimed in claim 40, wherein at least one predetermined region in each of said colour channels is masked irrespective of whether halftone is detected in each of said colour channels.

44. A method for processing an image to detect halftone, said method comprising the steps of:
  arranging said image into a plurality of bands each comprising a predetermined number of consecutive lines of pixels;
  arranging each of said plurality of bands into a plurality of tiles of pixels;
  selecting one of said plurality of tiles as a selected portion;
  generating a frequency domain representation of each of a plurality of colour channels relating to said selected portion; and
  processing data relating to predetermined regions in said frequency domain representations; and
  detecting halftone present in said selected portion based on a result of said processing step and on a result of processing at least one other portion of said image.

45. A method as claimed in claim 44, comprising the further step of determining a category of each said frequency domain representation, wherein said category is selected from the group of categories consisting of:
  said frequency domain representation comprises no halftone;
  said frequency domain representation comprises only halftone; and
  said frequency domain representation comprises halftone and non-halftone portions.

46. A method as claimed in claim 44, comprising the further steps of:
  preparing a frequency mask based on a result of said processing step;
  applying said frequency mask to at least one of said predetermined regions in said frequency domain representations of said selected portion; and
  converting said frequency domain representations to a spatial domain representation.

47. A method as claimed in claim 46, wherein said frequency mask is prepared based on one or more halftone categories detected in said selected portion, said one or more halftone categories selected from the group of halftone categories consisting of:
  standard halftone; and
  colour laser copier (CLC) halftone.

48. A method as claimed in claim 46, wherein said frequency mask comprises a band-stop filter for removing dominant halftone frequency components.

49. A method as claimed in claim 46, wherein at least one predetermined region in each of said colour channels is masked irrespective of whether halftone is detected in each of said colour channels.

50. A computer program product comprising a computer readable medium comprising a computer program recorded therein for processing an image to detect halftone, said computer program product comprising:
  computer program code for arranging said image into a plurality of bands each comprising a predetermined number of consecutive lines of pixels;
  computer program code for arranging each of said plurality of bands into a plurality of tiles of pixels;
  computer program code for selecting one of said plurality of tiles as a selected portion;
  computer program code for generating a frequency domain representation of each of a plurality of colour channels relating to said selected portion;
  computer program code for processing data relating to predetermined regions in said frequency domain representations; and
  computer program code for detecting halftone present in said selected portion based on a result of said processing and on a result of processing at least one other portion of said image.

51. An apparatus for processing an image to detect halftone, said apparatus comprising:
  a memory for storing data and instructions to be performed by a processing unit; and
  a processing unit coupled to said memory unit, said processing unit being programmed to:

arrange said image into a plurality of bands each comprising a predetermined number of consecutive lines of pixels;
arrange each of said plurality of bands into a plurality of tiles of pixels;
select one of said plurality of tiles as a selected portion;
generate a frequency domain representation of each of a plurality of colour channels relating to said selected portion;
process data relating to predetermined regions in said frequency domain representations; and
detect halftone present in said selected portion based on a result of said processing and on a result of processing at least one other portion of said image.

* * * * *